(12) United States Patent
Kawamura

(10) Patent No.: US 8,976,182 B2
(45) Date of Patent: Mar. 10, 2015

(54) FACIAL SKETCH CREATION DEVICE, CONFIGURATION INFORMATION GENERATION DEVICE, CONFIGURATION INFORMATION GENERATION METHOD, AND STORAGE MEDIUM

(75) Inventor: Ryo Kawamura, Tokyo (JP)

(73) Assignee: So-Net Entertainment Corporation, Tokyo (JP)

( * ) Notice: Subject to any disclaimer, the term of this patent is extended or adjusted under 35 U.S.C. 154(b) by 442 days.

(21) Appl. No.: 13/372,537

(22) Filed: Feb. 14, 2012

(65) Prior Publication Data

US 2012/0218270 A1 Aug. 30, 2012

(30) Foreign Application Priority Data

Feb. 24, 2011 (JP) ................................. 2011-038441

(51) Int. Cl.
*G06T 11/20* (2006.01)
*G06K 9/00* (2006.01)
*G06T 11/00* (2006.01)

(52) U.S. Cl.
CPC ............ *G06K 9/00248* (2013.01); *G06T 11/00* (2013.01)
USPC ........................................................ 345/441

(58) Field of Classification Search
None
See application file for complete search history.

(56) References Cited

U.S. PATENT DOCUMENTS

| 5,852,669 A * | 12/1998 | Eleftheriadis et al. ........ 382/118 |
| 2005/0100243 A1 * | 5/2005 | Shum et al. .................... 382/276 |
| 2005/0212821 A1 * | 9/2005 | Xu et al. ......................... 345/647 |
| 2006/0082579 A1 * | 4/2006 | Yao ................................. 345/473 |
| 2006/0153470 A1 * | 7/2006 | Simon et al. ................... 382/254 |
| 2008/0079716 A1 * | 4/2008 | Lynch ............................. 345/419 |
| 2008/0279469 A1 * | 11/2008 | Yamazaki ...................... 382/254 |
| 2011/0287391 A1 * | 11/2011 | Mallick et al. ................ 434/100 |

FOREIGN PATENT DOCUMENTS

| JP | 10105673 A | 4/1998 |
| JP | 2001-222725 A | 8/2001 |
| JP | 2005-228185 A | 8/2005 |

OTHER PUBLICATIONS

Iwashita et al., Expressive Facial Caricature Drawing, 1999, IEEE International Fuzzy Systems Conference Proceedings, pp. 1597-1602.*
Pallett et al., New Golden Ratios for Facial Beauty, 2010, Visual Research, vol. 50, pp. 149-154.*
Office Action issued by Japan Patent Office dated Feb. 26, 2013 with English translation.

* cited by examiner

*Primary Examiner* — Aaron M Richer
*Assistant Examiner* — Anh-Tuan V Nguyen
(74) *Attorney, Agent, or Firm* — Rabin & Berdo, P.C.

(57) ABSTRACT

A facial sketch creation device, a configuration information generation device, a configuration information generation method, and a storage medium that stores a computer program, which acquires position information for characteristic points that pertain to facial features within a facial image of a user, acquires a classification result in which the facial image has been classified as a facial type, using the position information for the characteristic points and based on relative positions of the facial features, and generates configuration information by taking an initial configuration that is based on the position information for the characteristic points and performing modification of the initial configuration by enhancing characteristics that indicate the classified facial type.

18 Claims, 24 Drawing Sheets

FIG. 2
| FACIAL TYPE CLASSIFICATIONS | <br>CLOSELY GROUPED FEATURES | <br>WIDELY SPACED FEATURES |
|---|---|---|
| | <br>HIGH-POSITIONED FEATURES | <br>LOW-POSITIONED FEATURES |
| | <br>UPTURNED FEATURES | <br>DOWNTURNED FEATURES |
| IMPRESSIONS | SMALL FACE, LIVELY, SENSITIVE, MATURE, MASCULINE, STERN, ACTIVE | MILD-MANNERED, ABSENTMINDED, IMMATURE, SENSIBLE-LOOKING, KIND, SAD-LOOKING |

FACIAL SKETCH CREATION DEVICE, CONFIGURATION INFORMATION GENERATION DEVICE, CONFIGURATION INFORMATION GENERATION METHOD, AND STORAGE MEDIUM

BACKGROUND OF THE INVENTION

1. Field of the Invention

The present disclosure relates to a facial sketch creation device, a configuration information generation device, a configuration information generation method, and a storage medium.

2. Description of Related Art

Among devices that automatically create a facial sketch based on a facial image, a device is known that converts the facial image into a sketch by performing line drawing processing on the facial image, for example. Based on the facial image, this sort of device can accurately reproduce the shape of a user's face that is contained in the facial image, the configuration of the various parts of the face, and the like.

In contrast to this, illustrators, facial sketch artists, and the like who are said to be proficient at drawing facial sketches draw facial sketches by analyzing the characteristics of the user's face, based on their own experience and know-how, in order to draw a facial sketch that looks like the subject. In the process, many illustrators and facial sketch artists draw the sketch by enhancing the characteristics of the user's face. Illustrators and facial sketch artists know from experience that when drawing a facial sketch, enhancing the user's characteristics makes it possible to draw a facial sketch that more closely resembles the subject.

Accordingly, a character provision system that performs processing that enhances the characteristics of a face has been disclosed in Japanese Patent Application Publication No. JP-A 2005-228185, for example. The character provision system includes an exaggeration processing portion that exaggerates the characteristics of facial features that have characteristics that deviate from a standard by more than a fixed amount. For example, in a case where the eyes are larger than a standard range, transformation processing is performed that makes the eyes larger.

Incidentally, the impression that a face makes is strongly influenced by the configuration of the various facial features. Accordingly, an image processing device is disclosed in Japanese Patent Application Publication No. JP-A 2001-222725 that includes a facial features configuration position modification portion that is used in creating an animation based on a facial image. For a user for whom the distance between the eyes is greater than average, for example, the image processing device performs modification by enhancing the image such that the eyes are farther apart.

SUMMARY OF THE INVENTION

However, with the method that is described in Japanese Patent Application Publication No. JP-A 2001-222725 for enhancing the differences from average values for the various facial features, a problem arises in that the balance among a plurality of the features is not taken into account, so that in the end, it is difficult to create a facial sketch that resembles the user.

Accordingly, in light of the problem that is described above, the present disclosure provides a facial sketch creation device, a configuration information generation device, a configuration information generation method, and a storage medium that are capable of generating, based on the relative positions of a plurality of facial features, facial features configuration information that is used for generating a facial sketch in which an impression that is received based on the balance of the facial features is enhanced.

According to an embodiment of the present disclosure, there is provided a facial sketch creation device, including an image acquisition portion that acquires a facial image of a user, a characteristic point acquisition portion that acquires position information for characteristic points that pertain to a plurality of facial features within the facial image, a facial type classification portion that, using the position information for the characteristic points, classifies the facial image as a facial type based on relative positions of the plurality of the facial features, a configuration information generation portion that generates configuration information by taking an initial configuration that is based on the position information for the characteristic points and performing modification of the initial configuration by enhancing characteristics that indicate the classified facial type, and a facial sketch creation portion that creates a facial sketch by positioning facial feature images based on the configuration information.

According to this configuration, the facial image is classified as a facial type based on the relative positions of the plurality of the facial features. Further, the configuration information is enhanced based on the facial type. The facial type that is used here is classified based on the relative positions of the plurality of the facial features. Therefore, the facial type reflects an impression that is made by the balance of the face as a whole. Moreover, the facial sketch creation device performs the enhancement processing based on the facial type, so it is able to perform the enhancement processing such that it reflects the impression that is made by the balance of the face as a whole. It is therefore possible to create a facial sketch that more accurately captures the characteristics of the subject's face.

The configuration information generation portion may perform the modification by linking a plurality of the facial features, using at least one of the position information on a vertical axis and the position information on a horizontal axis for the plurality of the facial features, and setting the position information for one of the plurality of the facial features based on a variation in the position information for another of the plurality of the facial features.

The facial type classification portion may include a first classification portion that classifies the facial image as one of a closely grouped features type, for which the positions of the facial features exhibit a characteristic of being shifted toward an inner side of a facial outline, and a widely spaced features type, for which the positions of the facial features exhibit a characteristic of being shifted toward an outer side of the facial outline, the classifying of the facial image being based on the horizontal axis position information that has been acquired by the characteristic point acquisition portion and that indicates a left eye, a right eye, a left edge of the facial outline, and a right edge of the facial outline, and the configuration information generation portion may include a first enhancement processing portion that modifies at least one of the position information on the vertical axis and the position information on the horizontal axis for the individual facial features, based on the result of the classification by the first classification portion.

The first enhancement processing portion may modify the vertical axis position information for a nose feature using an amount of modification that is based on an amount of modification of the vertical axis position information for a mouth feature.

The facial type classification portion may include a second classification portion that classifies the facial image as one of a high-positioned features type, for which the positions of the facial features exhibit a characteristic of being shifted toward an upper side of a facial outline, and a low-positioned features type, for which the positions of the facial features exhibit a characteristic of being shifted toward a lower side of the facial outline, the classifying of the facial image being based on the vertical axis position information that has been acquired by the characteristic point acquisition portion and that indicates a top edge of a forehead, a bottom edge of a chin, a top edge of a left eyehole, and a top edge of a right eyehole, and the configuration information generation portion may include a second enhancement processing portion that modifies the vertical axis position information for the individual facial features that are positioned within the facial outline, based on the result of the classification by the second classification portion.

The second enhancement processing portion may perform the modification such that changes in the vertical axis position information for a plurality of the facial features among the facial features that are positioned within the facial outline are in conjunction with one another.

The facial type classification portion may include a third classification portion that classifies the facial image as one of an upturned features type, for which the angles of the facial features exhibit a characteristic of being turned upward, and a downturned features type, for which the angles of the facial features exhibit a characteristic of being turned downward, the classifying of the facial image being based on the vertical axis position information that has been acquired by the characteristic point acquisition portion and that indicates an inner edge of a left eye, an outer edge of the left eye, an inner edge of a right eye, an outer edge of the right eye, an outer edge of a left nostril, an outer edge of a right nostril, and a center of the tip of a nose, and the configuration information generation portion may include a third enhancement processing portion that modifies angles of specific ones of the facial features, based on the result of the classification by the third classification portion.

The third enhancement processing portion may modify at least one of positioned angles of the eye features and angles of the nostrils for a nose feature.

The facial sketch creation portion may create the facial sketch using facial feature images in which the characteristics that indicate the classified facial type have been enhanced.

According to another embodiment of the present disclosure, there is provided a configuration information generation device, including a characteristic point acquisition portion that acquires position information for characteristic points that pertain to a plurality of facial features within a facial image of a user, a classification result acquisition portion that acquires a classification result in which the facial image has been classified as a facial type, using the position information for the characteristic points and based on relative positions of the plurality of the facial features, and a configuration information generation portion that generates configuration information by taking an initial configuration that is based on the position information for the characteristic points and performing modification of the initial configuration by enhancing characteristics that indicate the classified facial type.

According to another embodiment of the present disclosure, there is provided a configuration information generation method, including the steps of acquiring position information for characteristic points that pertain to a plurality of facial features within a facial image of a user, acquiring a classification result in which the facial image has been classified as a facial type, using the position information for the characteristic points and based on relative positions of the plurality of the facial features, and generating configuration information by taking an initial configuration that is based on the position information for the characteristic points and performing modification of the initial configuration by enhancing characteristics that indicate the classified facial type.

According to another embodiment of the present disclosure, there is provided a computer-readable storage medium in which is stored a program for causing a computer to function as a configuration information generation device that includes a characteristic point acquisition portion that acquires position information for characteristic points that pertain to a plurality of facial features within a facial image of a user, a classification result acquisition portion that acquires a classification result in which the facial image has been classified as a facial type, using the position information for the characteristic points and based on relative positions of the plurality of the facial features, and a configuration information generation portion that generates configuration information by taking an initial configuration that is based on the position information for the characteristic points and performing modification of the initial configuration by enhancing characteristics that indicate the classified facial type.

According to the present disclosure as explained above, it is possible to create facial features configuration information for creating a facial sketch that more closely resembles the subject.

BRIEF DESCRIPTION OF THE DRAWINGS

FIG. 2 is a figure that shows facial type classifications that are used in enhancement processing of a facial sketch creation device according to the present embodiment, as well as impressions that the various facial types make on people;

DETAILED DESCRIPTION OF THE EMBODIMENTS

Figure 1:
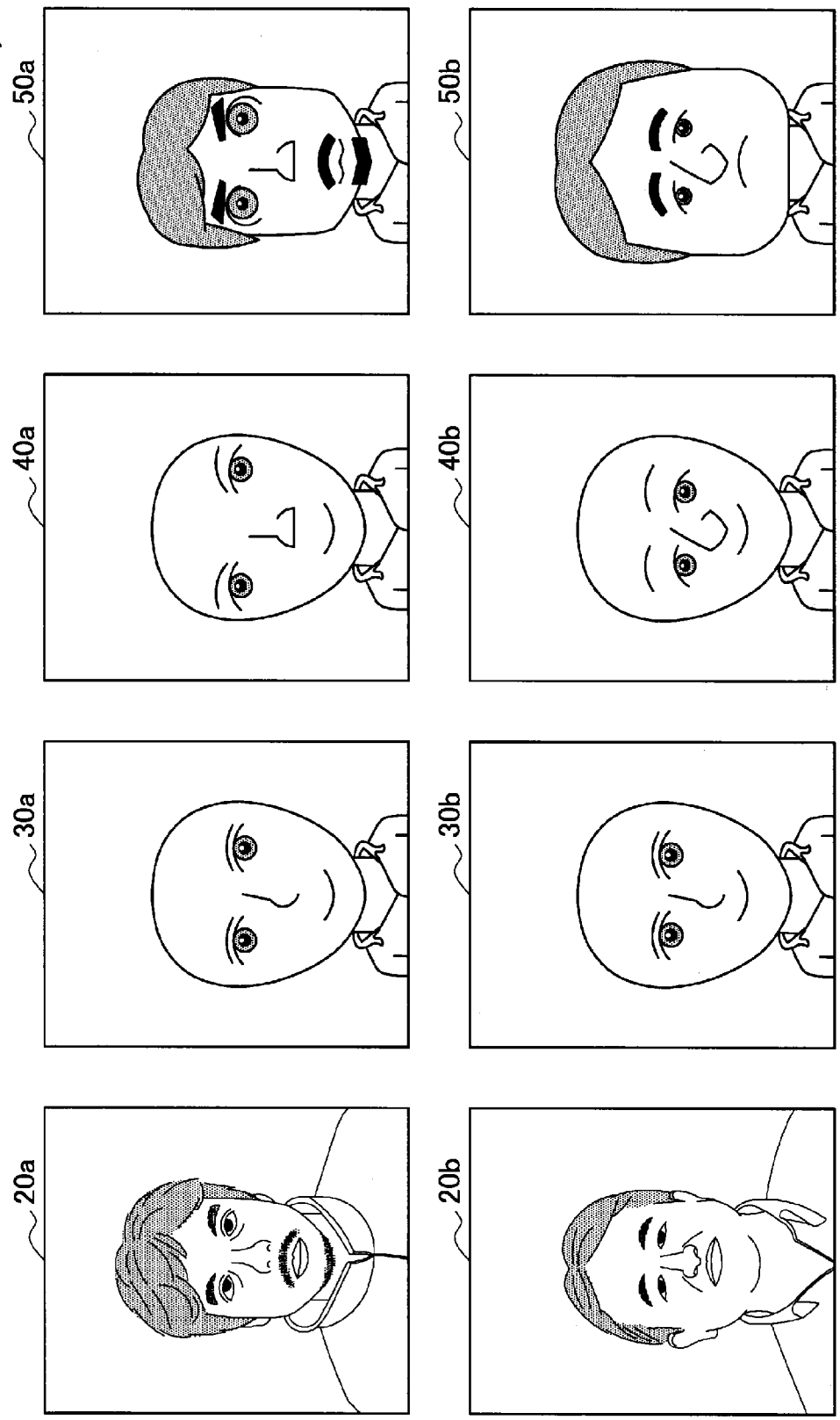
FIG. 1 is an explanatory figure that schematically shows a flow of facial sketch creation processing according to an embodiment of the present disclosure.

Hereinafter, preferred embodiments of the present disclosure will be described in detail with reference to the appended drawings. Note that, in this specification and the drawings, structural elements that have substantially the same function and structure are denoted with the same reference numerals, and repeated explanations of these structural elements are omitted.

Note that in some cases, in the specification and the drawings, pluralities of structural elements that are conceptually the same are distinguished by appending alphabetic characters to the same reference numerals. For example, facial photographs 20 are distinguished as necessary by being labeled as a facial photograph 20a for a user A and a facial photograph 20b for a user B. However, in a case where it is not necessary to specifically distinguish individual ones of the facial photographs 20, only the same reference numeral is used. For example, in a case where it is not necessary to specifically distinguish the facial photograph 20a, the facial photograph 20b, and the like, they are simply called the facial photographs 20.

Overview

Figure 3:
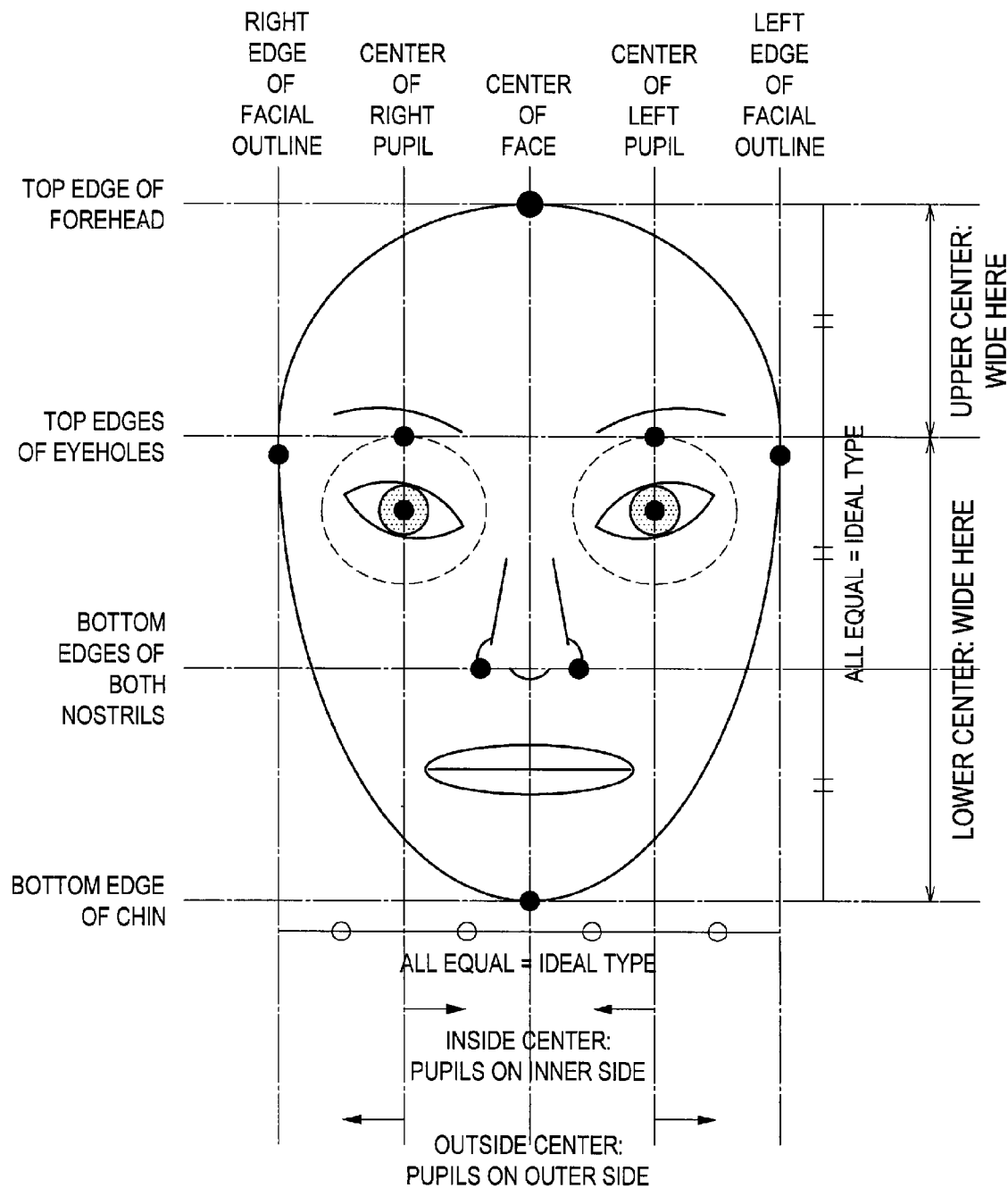
FIG. 3 is an explanatory figure that schematically shows relationships between positions of characteristic points in a facial image and the facial type classifications.

First, an overview of facial sketch creation processing according to an embodiment of the present disclosure will be explained with reference to FIGS. 1 to 3. FIG. 1 is an explanatory figure that schematically shows a flow of the facial sketch creation processing according to the embodiment of the present disclosure. FIG. 2 is a figure that shows facial type classifications that are used in enhancement processing of a facial sketch creation device according to the present embodiment, as well as impressions that the various facial types make on people. FIG. 3 is an explanatory figure that schematically shows relationships between positions of characteristic points in a facial image and the facial type classifications.

As shown in FIG. 1, in the present embodiment, the facial sketch creation processing includes a step of setting an initial configuration of images of various facial features based on results of an analysis of the facial photograph 20, a step of performing the enhancement processing, which enhances characteristics of the user's face based on a facial type that is classified based on the initial configuration, and a step of selecting the facial feature images and creating the facial sketch.

At this time, an initial image 30 is displayed that shows the initial configuration of the facial features. The initial image 30 is an image in which the various facial features are arranged in exactly the positions of characteristic points that have been identified in the facial photograph. In contrast to this, an enhanced image 40 is an image that is produced by performing the enhancement processing on the initial image to enhance the positions and angles of the facial features. Based on the configuration of the facial features in the enhanced image 40 after the enhancement processing has been performed, a facial sketch 50 can be created in which the characteristics of the subject's face have been enhanced by the positioning of the images of the selected facial features.

The initial image 30, which accurately reproduces the configuration of subject's facial features, would be expected to show the characteristics of the subject's face as they are. However, in many cases, the facial sketch 50, which is created based on the configuration of the facial features in the enhanced image 40, in which the characteristics have been enhanced, is usually felt by people who look at the facial sketch to resemble the subject more closely than does a facial sketch that is created based on the configuration of the facial features in the initial image 30.

The enhancement processing, in a case where it is performed by a person, is ordinarily performed based on experience and know-how. For example, in most cases, the facial sketch reflects an impression that is based on the balance of the face as a whole, instead of simply enhancing the characteristics of the individual facial features, such as by positioning the eyes farther apart because the actual eyes are widely spaced, or by making a large mouth even larger. However, in a case where this sort of processing is performed by a computer, a technique is sometimes used that compares characteristics such as the positions, the sizes, and the angles of individual facial features to specified average values and enhances the differences from the average values.

However, the impression that a face makes is strongly influenced by the balance in the relative positioning of the various features. Therefore, if the enhancement processing is performed separately for individual facial features, such as by enlarging the mouth because the mouth is large, lowering the eyes because the eyes droop, and separating the eyes because the eyes are widely spaced, there is a strong possibility that the balance of the face will be lost, making it difficult in the end to create a facial sketch that resembles the subject. Accordingly, the facial sketch creation device according to the present embodiment of the present disclosure is structured such that it classifies the facial type based on the impression that is made by balance of the features of the face as a whole and performs the enhancement processing based on the classified facial type.

The correspondence relationship between the facial type classifications that are used by the facial sketch creation device according to the present embodiment of the present disclosure and the impressions that are made by the various facial types is shown in FIG. 2. Hereinafter, the characteristics of the various facial types will be explained.

A closely grouped features facial type has the characteristic that the various facial features are grouped toward the center of the face within the facial outline. In contrast to this, a widely spaced features facial type has the characteristic that the various facial features are positioned toward the outer side of the face within the facial outline. Referring to FIG. 3, in a case where the distances between the right edge of the facial outline and the center of the right pupil, between the center of the right pupil and the center of the face, between the center of the face and the center of the left pupil, and between the center of the left pupil and the left edge of the facial outline are all equal, the face is defined as an ideal type in which the balance of the individual facial features is good. A case in which the positions of the pupils show a tendency to be positioned more toward the inner side of the face than in the ideal type can be said to be the closely grouped features facial type. On the other hand, a case in which the positions of the pupils show a tendency to be positioned more toward the outer side of the face than in the ideal type can be said to be the widely spaced features facial type.

A high-positioned features facial type has the characteristic that the various facial features are grouped toward the upper side of the face within the facial outline.

In contrast to this, a low-positioned features facial type has the characteristic that the various facial features are positioned toward the lower side of the face within the facial outline. Referring to FIG. 3, in a case where the distances between the top edge of the forehead and the top edges of the eyeholes, between the top edges of the eyeholes and the bottom edges of both nostrils, and between the bottom edges of both nostrils and the bottom edge of the chin are all equal, the face is defined as an ideal type in which the balance of the individual facial features is good. A case in which the distance from the top edges of the eyeholes to the bottom edge of the chin is greater than in the ideal type, such that the features are shifted toward the upper center, can be said to be the high-positioned features facial type. On the other hand, a case in which the distance from the top edge of the forehead to the top edges of the eyeholes is greater than in the ideal type, such that the features are shifted toward the lower center, can be said to be the low-positioned features facial type.

An upturned features facial type has the characteristic that the angles of the facial features are lifted up within the facial outline. In contrast to this, a downturned features facial type has the characteristic that the angles of the facial features are turned downward within the facial outline.

Note that the characteristics of the various facial types have been explained in general terms here. Details of the method for classifying the various facial types will be described later.

Among the facial types that are classified in this manner, the closely grouped features type, the high-positioned features type, and the upturned features type often give the impression of being small faces, lively, sensitive, mature, masculine, stern, and active, for example. The widely spaced features type, the low-positioned features type, and the downturned features type often give the impression of being mild-mannered, absentminded, immature, sensible-looking, kind, and sad-looking. In the present embodiment, the enhancement processing that enhances the facial characteristics is performed based on the facial type.

Configuration

Figure 4:
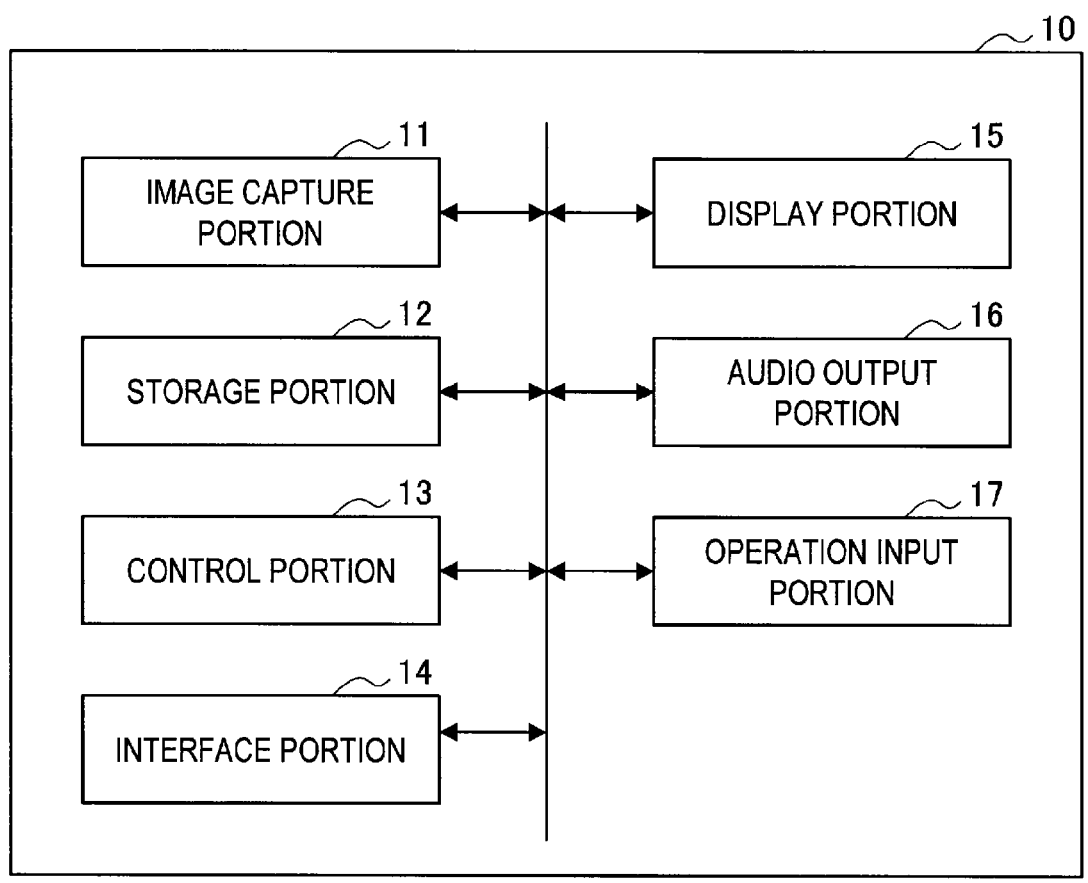
FIG. 4 is a block diagram that shows a configuration of the facial sketch creation device according to the present embodiment.
Figure 5:
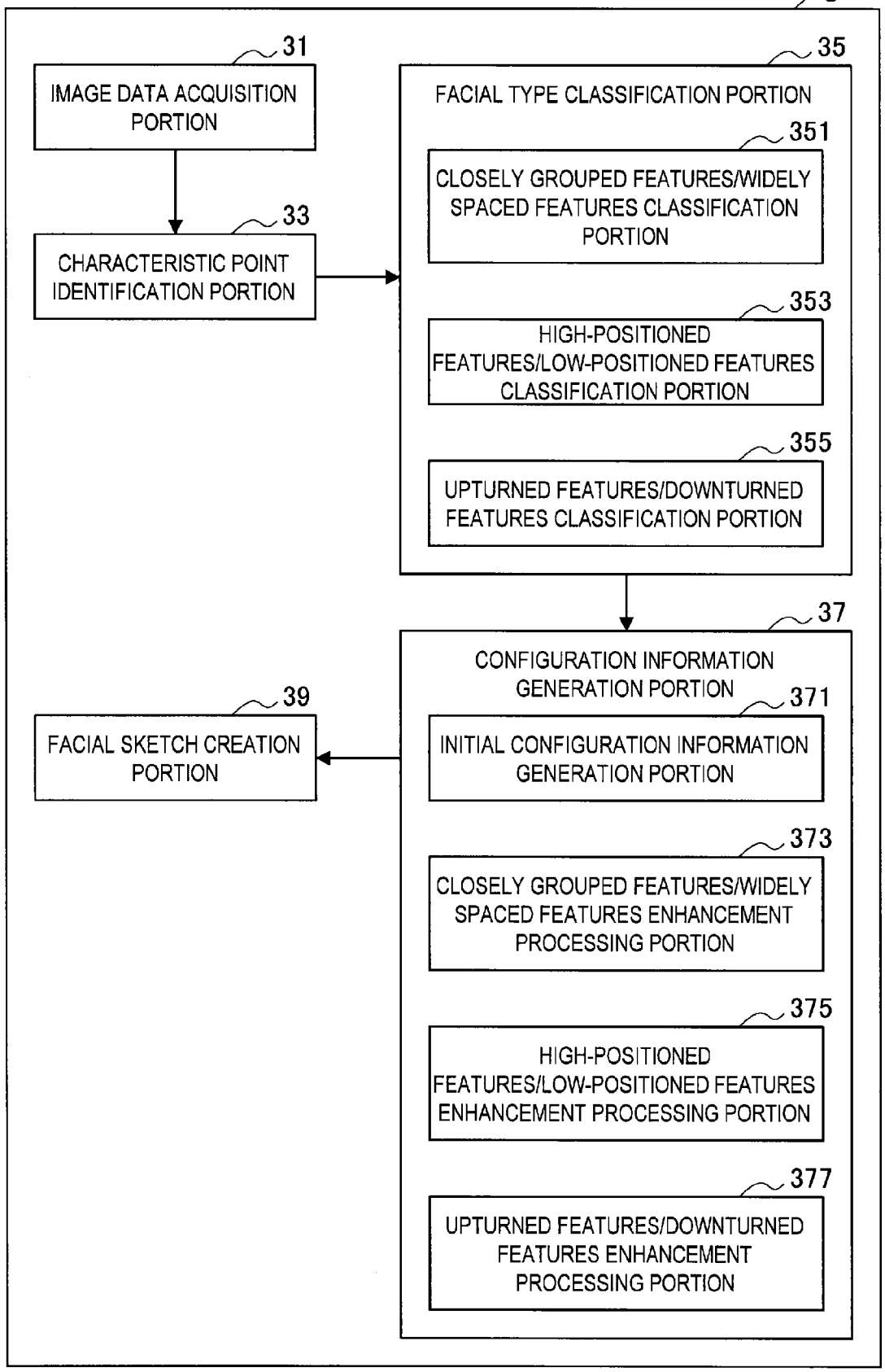
FIG. 5 is a block diagram that shows a configuration of a control portion of the facial sketch creation device according to the present embodiment.

Next, the configuration of the facial sketch creation device according to the present embodiment of the present disclosure will be explained with reference to FIGS. 4 and 5. FIG. 4 is a block diagram that shows the configuration of the facial sketch creation device according to the present embodiment. FIG. 5 is a block diagram that shows a configuration of a control portion of the facial sketch creation device according to the present embodiment.

A facial sketch creation device 10 that is shown in FIG. 4 has a function that creates a facial sketch based on a facial image of the user. The facial sketch creation device 10 may be an information processing device such as a personal computer (PC), a home image processing device (a DVD recorder, a video recorder, or the like), a personal digital assistant (PDA), a home game device, an electrical appliance, or the like, for example. The facial sketch creation device 10 may also be an information processing device such as a mobile telephone, a Personal Handyphone System (PHS), a portable music playback device, a portable image processing device, a portable game device, or the like. Note that the facial sketch creation device 10 is an example of a configuration information generation device.

The facial sketch creation device 10 mainly includes an image capture portion 11, a storage portion 12, a control portion 13, an interface portion 14, a display portion 15, an audio output portion 16, and an operation input portion 17.

The image capture portion 11 may include a lens, an image capture element, and a signal processing portion, for example, and has an image capture function. The image capture portion 11 can input an acquired image to the control portion 13. Alternatively, the image capture portion 11 can store an acquired image in the storage portion 12.

The storage portion 12 is a device for data storage, and it can include a storage medium, a recording device that records data in the storage medium, a read device that reads the data from the storage medium, a deletion device that deletes the data that have been recorded in the storage medium, and the like. A magnetic storage medium such as a hard disk drive (HDD) or the like, as well as a non-volatile memory such as an electronically erasable and programmable read only memory (EEPROM), a flash memory, a magneto-resistive random access memory (MRAM), a ferro-electric random access memory (FeRAM), a phase change random access memory (PRAM), or the like, for example, can be used as the storage medium. The storage portion 12 can store a program that the control portion 13 executes, for example, as well as various types of data.

The control portion 13 is implemented by one of a control device and a computational processing device such as a central processing unit (CPU), a microprocessor, or the like, for example, and includes a function that controls all of the operations within the facial sketch creation device 10 in accordance with various types of programs. A detailed configuration of the control portion 13 will be described later using FIG. 5.

The interface portion 14 is a connection interface for connecting with an external device. The interface portion 14, may, for example, be a communications interface that is configured from a communication device or the like for connecting with an external device through a communication network. The interface portion 14 may also be a communication device that is compatible with a wireless local area network (LAN), and may also be a wired communication device that performs communication through wires. The interface portion 14 may also be a communication device for performing communication in accordance with a standard such as the Universal Serial Bus (USB) or the like. Alternatively, the interface portion 14 may be a slot for inserting a storage medium such as a memory card or the like.

The display portion 15 is configured from a display device such as liquid crystal display (LCD) device, an organic light-emitting diode (OLED) device, a cathode ray tube (CRT) display device, or the like, for example. The display portion 15 includes a function that provides an image of the generated facial sketch to the user by displaying it.

The audio output portion 16 has a function that outputs audio data or the like that are played back, and is configured from a speaker, for example.

The operation input portion 17 is configured from an input portion for the user to input information, such as a mouse, a keyboard, a touch panel, a button, a microphone, a switch, a lever, or the like, for example, and from an input control circuit or the like for generating an input signal based on the input from the user and for outputting the input signal to the control portion 13. By operating the operation input portion 17, the user of the facial sketch creation device 10 can input various types of data to the facial sketch creation device 10 and can issue a command for a processing operation. In a case where the input portion is a touch panel, the touch panel can be provided by being superposed on the display portion 15.

Next, the detailed configuration of the control portion 13 of the facial sketch creation device 10 will be explained with reference to FIG. 5. The control portion 13 mainly includes the functions of an image data acquisition portion 31, a characteristic point identification portion 33, a facial type classification portion 35, a configuration information generation portion 37, and a facial sketch creation portion 39.

The image data acquisition portion 31 is an example of an image acquisition portion, and it has a function that acquires data for a facial image of the user. The image data acquisition portion 31 may also acquire image data that the image capture portion 11 has captured. The image data acquisition portion 31 may also acquire image data that are stored in the storage portion 12. Alternatively, the image data acquisition portion 31 may also acquire image data that are stored in an external device that is connected through the interface portion 14.

The characteristic point identification portion 33 is an example of a characteristic point acquisition portion, and it has a function that, by analyzing the image data that have been acquired by the image data acquisition portion 31, identifies position information for characteristic points that are related to the various facial features of the user (for example, the facial outline, the eyes, the eyebrows, the nose, the mouth, the ears, and the like). Here, it is preferable for the characteristic points to be points for various facial features whose relative positions and angles in relation to the facial outline can be detected, for example. The characteristic points that are related to the eyes, for example, can be defined as the inner edges, the outer edges, the centers of pupils, and the top edges of the eyeholes. The characteristic points that are related to the nose, for example, can be defined as the center of the tip of the nose and the right edge and the left edge of the nostrils. In the present embodiment, the position information for the various characteristic points is automatically identified by using image analysis software or the like, but the present disclosure is not limited to this method. For example, the position information for the characteristic points may also be specified based on position information that has been input for the facial image that is being displayed on the display portion 15 by using the operation input portion 17.

The facial type classification portion 35 is an example of a classification result acquisition portion, and it has a function that classifies the user's facial type into one of a plurality of specified facial types, based on the position information for the characteristic points that are related to the various facial features that have been identified by the characteristic point identification portion 33. More specifically, the facial type classification portion 35 has functions of a closely grouped features/widely spaced features classification portion 351, a high-positioned features/low-positioned features classification portion 353, and an upturned features/downturned features classification portion 355.

The closely grouped features/widely spaced features classification portion 351 has a function of a first classification portion of the facial type classification portion 35, and it classifies the user's face as one of the specified closely grouped features type and widely spaced features type based on horizontal axis (X axis) position information that has been identified by the characteristic point identification portion 33 and that indicates the left eye, the right eye, the left edge of the facial outline, and the right edge of the facial outline. The closely grouped features/widely spaced features classification portion 351 determines whether or not the sum of the absolute value of the difference between the horizontal axis coordinates for the left edge of the facial outline and the center of the left eye and the absolute value of the difference between the horizontal axis coordinates for the right edge of the facial outline and the center of the right eye is greater than the absolute value of the difference between the horizontal axis coordinates for the center of the left eye and the center of the right eye. Based on the determination result, the closely grouped features/widely spaced features classification portion 351 classifies the user's face as one of the closely grouped features type and the widely spaced features type. The closely grouped features type has the characteristic that the positions of the various facial features are toward the inner side (the center) of the face. The widely spaced features type has the characteristic that the positions of the various facial features are toward the outer side of the face.

The high-positioned features/low-positioned features classification portion 353 has a function of a second classification portion of the facial type classification portion 35, and it classifies the user's face as one of the specified high-positioned features type and low-positioned features type based on vertical axis (Y axis) position information that has been identified by the characteristic point identification portion 33 and that indicates the top edge of the forehead, the bottom edge of the chin, the top edge of the left eyehole, and the top edge of the right eyehole. Here, the top edge of each of the left and the right eyeholes is defined as a point on a line segment that connects the center point of the corresponding eye with the center point of the corresponding eyebrow, the distance to the point from the center point of the eye being twice the distance to the point from the center point of the eyebrow. The high-positioned features/low-positioned features classification portion 353 determines whether or not a value that is twice the sum of the absolute value of the difference between the vertical axis coordinates for the top edge of the forehead and the top edge of the left eyehole and the absolute value of the difference between the vertical axis coordinates for the top edge of the forehead and the top edge of the right eyehole is greater than the sum of the absolute value of the difference between the vertical axis coordinates for the top edge of the left eyehole and the bottom edge of the chin and the absolute value of the difference between the vertical axis coordinates for the top edge of the right eyehole and the bottom edge of the chin. Based on the determination result, the high-positioned features/low-positioned features classification portion 353 classifies the user's face as one of the high-positioned features type and the low-positioned features type. The high-positioned features type has the characteristic that the positions of the various facial features are toward the upper side of the face (the forehead side being defined as up). The low-positioned features type has the characteristic that the positions of the various facial features are toward the lower side of the face (the chin side being defined as down).

The upturned features/downturned features classification portion 355 has a function of a third classification portion of the facial type classification portion 35, and it classifies the user's face as one of the specified upturned features type and downturned features type based on vertical axis position information that has been identified by the characteristic point identification portion 33 and that indicates the outer edge of the left eye, the inner edge of the left eye, the outer edge of the right eye, the inner edge of the right eye, the outer edge of the left nostril, the outer edge of the right nostril, and the center of the tip of the nose. The upturned features/downturned features classification portion 355 determines whether or not the sum of the difference between the vertical axis coordinates for the outer edge of the left eye and the inner edge of the left eye and the difference between the vertical axis coordinates for the outer edge of the right eye and the inner edge of the right eye is not less than zero and also determines whether or not the sum of the difference between the vertical axis coordinates for the outer edge of the left nostril and the center of the tip of the nose and the difference between the vertical axis coordinates for the outer edge of the right nostril and the center of the tip of the nose is not less than zero. Based on the determination result, the upturned features/downturned features classification portion 355 classifies the user's face as one of the upturned features type and the downturned features type. The upturned features type has the characteristic that the various facial features have a tendency to be lifted up. The downturned features type has the characteristic that the various facial features have a tendency to be turned downward.

The configuration information generation portion 37 has a function that, based on the results of the classifications by the facial type classification portion 35, generates configuration information that includes the positions and the angles of the various facial features that are positioned on a facial outline feature. First, the configuration information generation portion 37 uses an initial configuration information generation portion 371 to generate initial configuration information that is able to accurately reproduce the positions of the characteristic points, based on the position information for the characteristic points that have been identified by the characteristic point identification portion 33. Then a closely grouped features/widely spaced features enhancement processing portion 373, a high-positioned features/low-positioned features enhancement processing portion 375, and a upturned features/downturned features enhancement processing portion 377 perform the enhancement processing based on the corresponding facial type classifications and generate the configuration information for the various facial features for generating the facial sketch.

Note that the configuration information generation portion 37 may also perform modification by linking a plurality of the facial features by setting the position information for the plurality of the facial features based on the variations in the position information for other facial features. Performing the modification by linking the plurality of the facial features makes it possible to maintain the balance of the face as a whole.

The initial configuration information generation portion 371 has a function that generates the initial configuration information that accurately reproduces the positions of the characteristic points, as described above. Defining the initial configuration as representing the positions of the user's various facial features makes it possible to then perform the enhancement processing that further enhances the actual configuration.

The closely grouped features/widely spaced features enhancement processing portion 373 is an example of a first enhancement processing portion, and it performs the enhancement processing based on the classification results of the closely grouped features/widely spaced features classification processing by the closely grouped features/widely spaced features classification portion 351. For the initial configuration information for a user's face that has been classified as the closely grouped features type, the closely grouped features/widely spaced features enhancement processing performs modification processing such that the facial features that are positioned within the facial outline are brought closer to the center of the face. For the initial configuration information for a user's face that has been classified as the widely spaced features type, the closely grouped features/widely spaced features enhancement processing performs modification processing such that the facial features that are positioned within the facial outline are moved farther away from the center of the face.

The high-positioned features/low-positioned features enhancement processing portion 375 is an example of a second enhancement processing portion, and it performs the enhancement processing based on the classification results of the high-positioned features/low-positioned features classification processing by the high-positioned features/low-positioned features classification portion 353. For the initial configuration information for a user's face that has been classified as the high-positioned features type, the high-positioned features/low-positioned features enhancement processing performs modification processing such that the facial features that are positioned within the facial outline are brought closer to the upper portion of the face. For the initial configuration information for a user's face that has been classified as the low-positioned features type, the high-positioned features/low-positioned features enhancement processing performs modification processing such that the facial features that are positioned within the facial outline are brought closer to the lower portion of the face.

The upturned features/downturned features enhancement processing portion 377 is an example of a third enhancement processing portion, and it performs the enhancement processing based on the classification results of the upturned features/downturned features classification processing by the upturned features/downturned features classification portion 355. For the initial configuration information for a user's face that has been classified as the upturned features type, the upturned features/downturned features enhancement processing modifies the angles of specific facial features such that the angles are lifted up. For the initial configuration information for a user's face that has been classified as the downturned features type, the upturned features/downturned features enhancement processing modifies the angles of specific facial features such that the angles are turned downward. The specific facial features may be the eyes and the nose, for example.

The facial sketch creation portion 39 has a function that creates the facial sketch based on the configuration information that has been generated by the configuration information generation portion 37. The facial sketch creation portion 39 may use the configuration information, the classified facial type, and the position information for the characteristic points for creating the facial sketch. For example, the facial sketch creation portion 39 may select, from among facial feature images that have been prepared in advance, facial feature images that will be used for creating the facial sketch based on the classified facial type. In the process, the facial sketch creation portion 39 may also perform transformation processing on the facial feature images, based on the facial type or the like, and may also generate new facial feature images based on the results of an analysis of the facial image, for example. The facial sketch creation portion 39 is able to create the facial sketch by taking the facial feature images that have been selected by one of the methods described above and placing them in positions that are indicated by the configuration information that has been generated by the configuration information generation portion 37.

An example of the function of the facial sketch creation device 10 according to the present embodiment has been described. The various structural elements described above may be configured using general-purpose members and circuits, and they may also be configured from hardware that has been specialized for the functions of the structural elements. The functions of the various structural elements may also be implemented by having a computation device such as a central processing unit (CPU) or the like read, from a storage medium such as a read only memory (ROM), a random access memory (RAM), or the like in which a control program is stored, a control program that describes a processing sequence that implements the functions, and then interpret and execute the program. It is therefore possible to modify, as desired, the configuration that will be used, according to the level of the technology by which the present embodiment is implemented.

Note that it is also possible to create a computer program for implementing the various functions of the facial sketch creation device 10 according to the present embodiment that have been described above, and to install the program in a personal computer or the like. It is also possible to provide a computer-readable storage medium in which this sort of computer program is stored. The storage medium may be, for example, a magnetic disk, an optical disk, a magneto-optical disk, a flash memory, or the like. The computer program that is described above may also be distributed through a network, for example, instead of using the storage medium.

Facial Sketch Creation Processing

Figure 6:
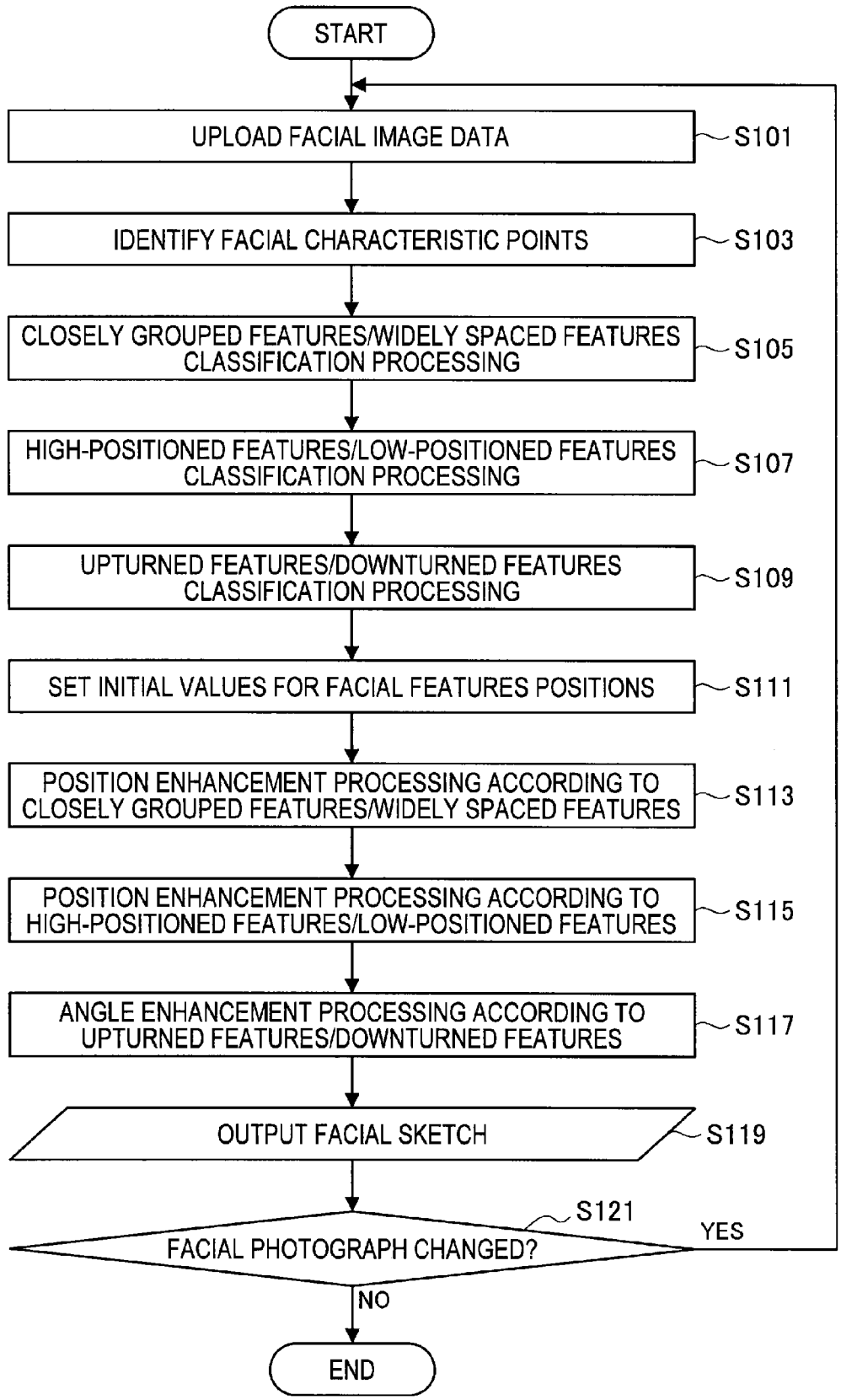
FIG. 6 is a flowchart that shows the flow of the entire facial sketch creation processing according to the present embodiment.

Next, the flow of the entire facial sketch creation processing according to the present embodiment of the present disclosure will be explained with reference to FIG. 6. FIG. 6 is a flowchart that shows the flow of the entire facial sketch creation processing according to the present embodiment.

First, the image data that show the user's face are uploaded by software for implementing the functions of the facial sketch creation device 10 (Step S101). It is preferable for the image data that are used here to be data for an image that captures a frontal view of the user's face.

Figure 7:
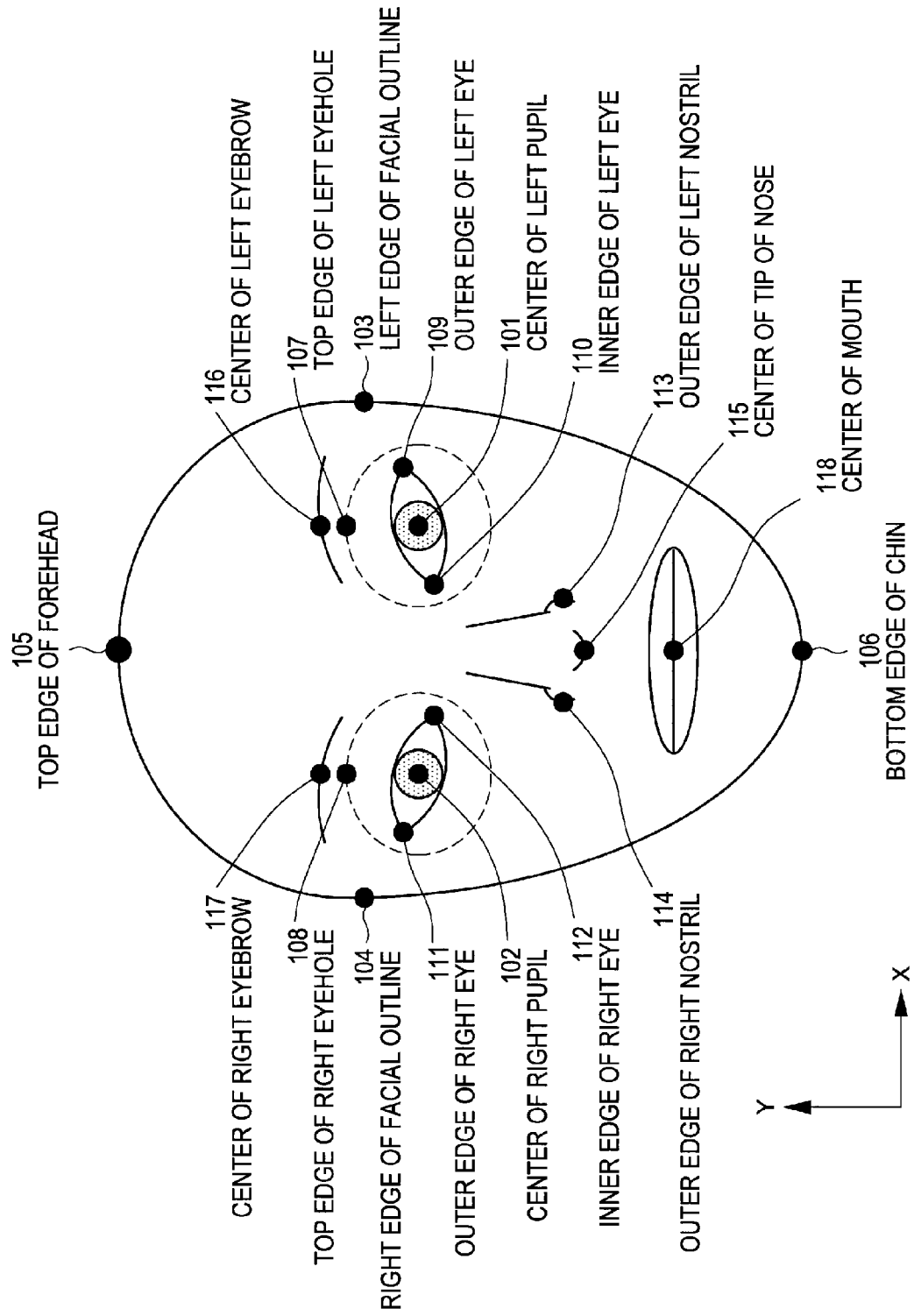
FIG. 7 is an explanatory figure that shows the characteristic points that the facial sketch creation device according to the present embodiment identifies.

Next, the characteristic point identification portion 33 identifies specified characteristic points in the uploaded facial image (Step S103). The characteristic points that are identified here are as shown in FIG. 7. FIG. 7 is an explanatory figure that shows the characteristic points that are identified by the facial sketch creation device 10 according to the present embodiment. As shown in FIG. 7, the characteristic point identification portion 33 identifies a center of the left pupil 101, a center of the right pupil 102, a left edge of the facial outline 103, a right edge of the facial outline 104, a top edge of the forehead 105, a bottom edge of the chin 106, a top edge of the left eyehole 107, a top edge of the right eyehole 108, an outer edge of the left eye 109, an inner edge of the left eye 110, an outer edge of the right eye 111, an inner edge of the right eye 112, an outer edge of the left nostril 113, an outer edge of the right nostril 114, a center of the tip of the nose 115, a center of the left eyebrow 116, a center of the right eyebrow 117, and a center of the mouth 118. The characteristic point identification portion 33 also acquires the position information for each of the characteristic points. Note that the position information for each of the characteristic points may also be position information for the points that the user has input using the operation input portion 17. Here, the position information for the center of the left pupil 101, for example, is expressed as $[X_{101}, Y_{101}]$.

Facial Type Classification Processing

Next, the facial type classification portion 35 performs the closely grouped features/widely spaced features classification processing by the closely grouped features/widely spaced features classification portion 351 (Step S105), the high-positioned features/low-positioned features classification processing by the high-positioned features/low-positioned features classification portion 353 (Step S107), and the upturned features/downturned features classification processing by the upturned features/downturned features classification portion 355 (Step S109). Hereinafter the different types of the classification processing will be explained in detail in order.

Closely grouped features/widely spaced features classification processing

Figure 8:
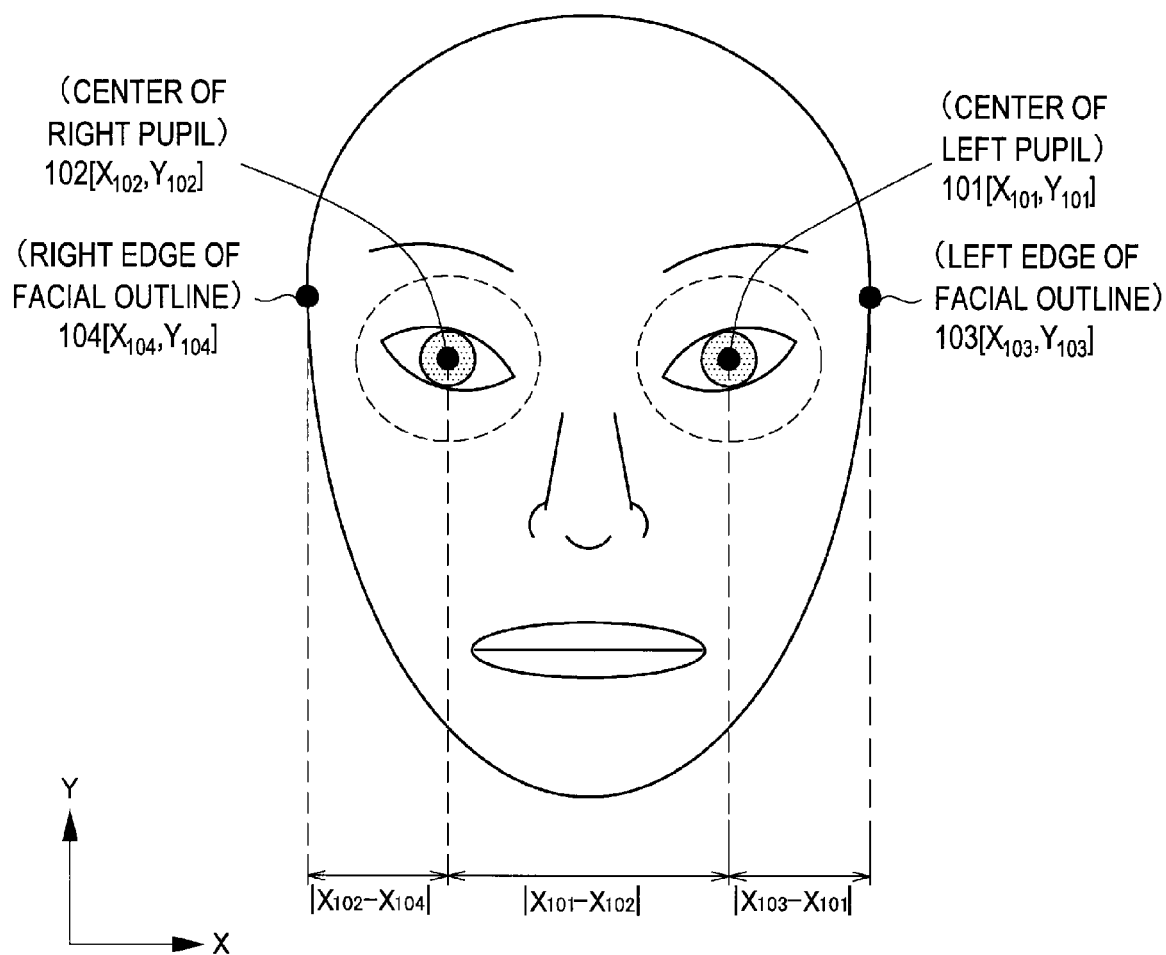
FIG. 8 is an explanatory figure that shows the characteristic points that are used for closely grouped features/widely spaced features classification according to the present embodiment.
Figure 9:
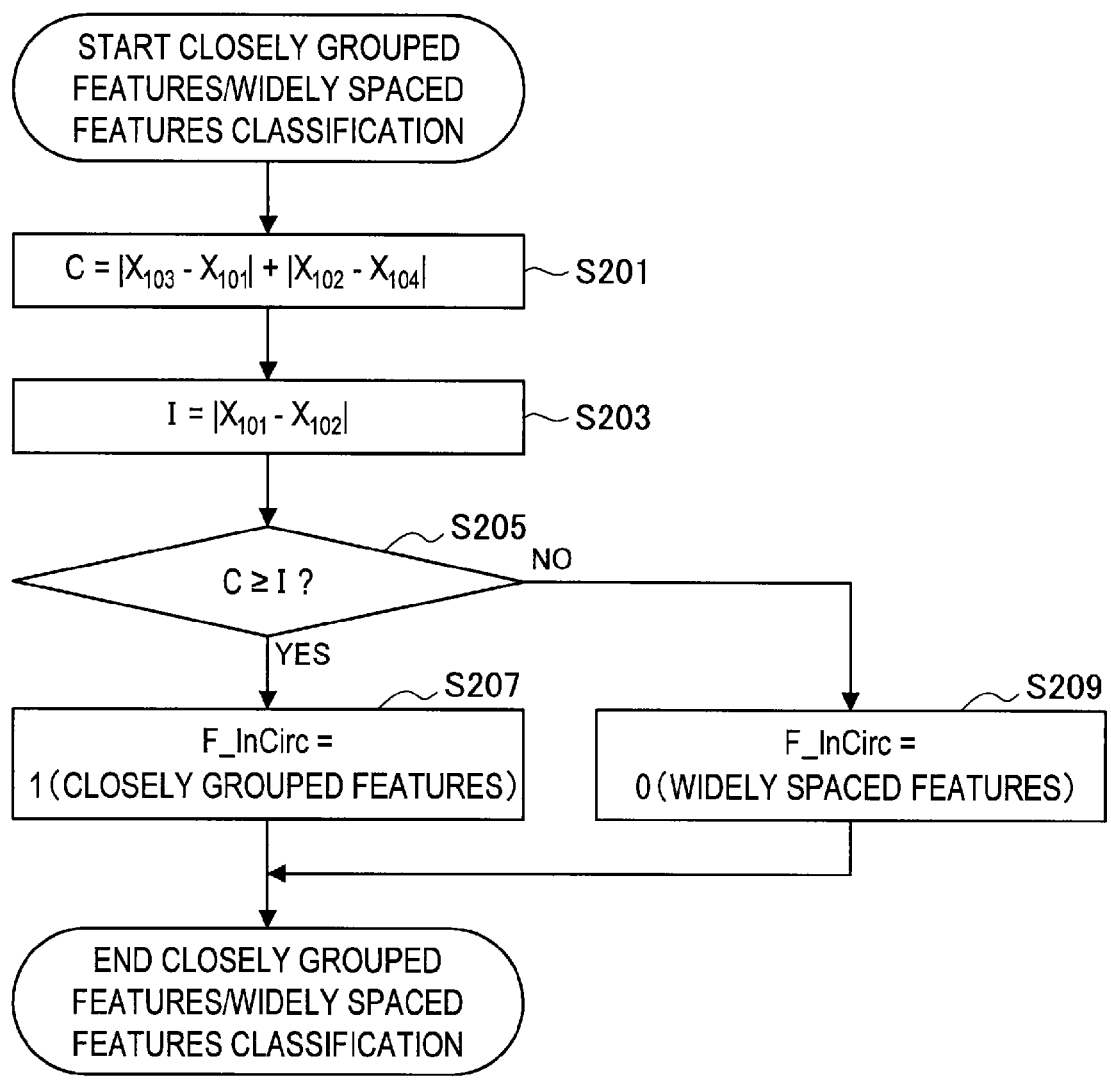
FIG. 9 is a flowchart that shows a differentiation algorithm in the closely grouped features/widely spaced features classification processing according to the present embodiment.

First, the closely grouped features/widely spaced features classification processing by the closely grouped features/widely spaced features classification portion 351 at Step S105 will be explained with reference to FIGS. 8 and 9. FIG. 8 is an explanatory figure that shows the characteristic points that are used for the closely grouped features/widely spaced features classification according to the present embodiment. FIG. 9 is a flowchart that shows a differentiation algorithm in the closely grouped features/widely spaced features classification processing according to the present embodiment.

As shown in FIG. 8, in the closely grouped features/widely spaced features classification processing, the determining of the classification of the closely grouped features type and the widely spaced features type is made by using, as chosen reference points, from among the various characteristic points of the face that were identified at Step S103, the position information for the center of the left pupil 101 (X axis coordinate=$X_{101}$, Y axis coordinate=$Y_{101}$), the center of the right pupil 102 (X axis coordinate=$X_{102}$, Y axis coordinate=$Y_{102}$), the left edge of the facial outline 103 (X axis coordinate=$X_{103}$, Y axis coordinate=$Y_{103}$), and the right edge of the facial outline 104 (X axis coordinate=$X_{104}$, Y axis coordinate=$Y_{104}$).

In FIG. 9, when the closely grouped features/widely spaced features classification processing is started, the position information that was acquired at Step S103 for the various reference points that are described above is referenced, and the closely grouped features/widely spaced features classification portion 351 computes a sum C of the absolute value of the difference between the X axis coordinates for the left edge of the facial outline 103 and the center of the left pupil 101 ($|X_{103}-X_{101}|$) and the absolute value of the difference between the X axis coordinates for the center of the right pupil 102 and the right edge of the facial outline 104 ($|X_{102}-X_{104}|$)

(Step S201). Next, the closely grouped features/widely spaced features classification portion 351 computes an absolute value I of the difference between the X axis coordinates for the center of the left pupil 101 and the center of the right pupil 102 ($|X_{101}-X_{102}|$) (Step S203).

Next, the closely grouped features/widely spaced features classification portion 351 compares the sum C that was computed at Step S201 and the absolute value I that was computed at Step S203 (Step S205). In a case where the sum C is not less than the absolute value I, the distance between the left and right pupils is narrower than the total width on the outer sides of the left and right pupils, so the determination is made that the face is the closely grouped features type, and the closely grouped features/widely spaced features classification portion 351 sets a closely grouped features/widely spaced features determination variable F_InCirc to 1 (Step S207). On the other hand, in a case where the sum C is less than the absolute value I at Step S205, the distance between the left and right pupils is wider than the total width on the outer sides of the left and right pupils, so the determination is made that the face is the widely spaced features type, and the closely grouped features/widely spaced features classification portion 351 sets the closely grouped features/widely spaced features determination variable F_InCirc to zero (Step S209).

High-positioned features/low-positioned features classification processing

Figure 10:
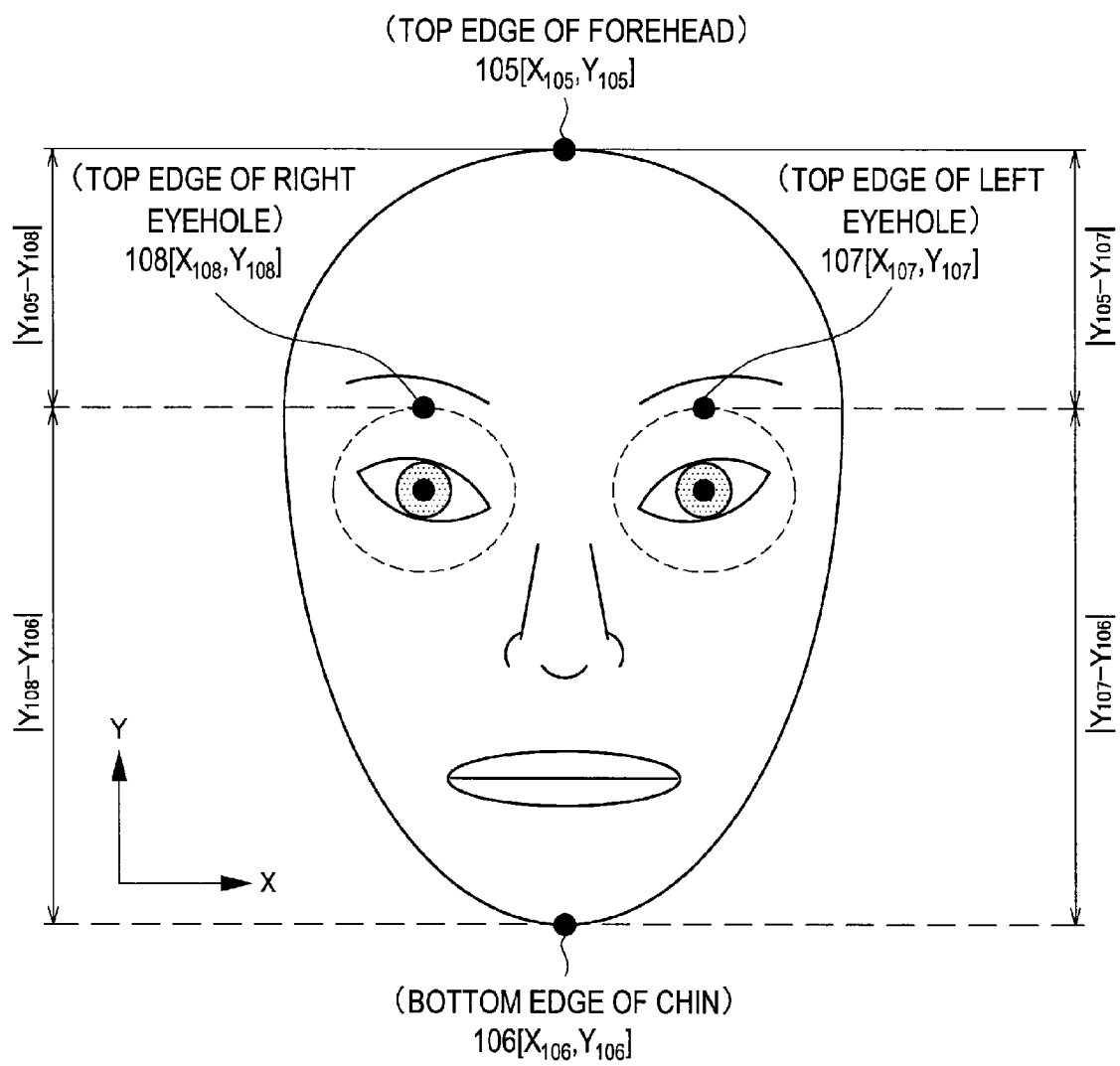
FIG. 10 is an explanatory figure that shows the characteristic points that are used for high-positioned features/low-positioned features classification according to the present embodiment.
Figure 11:
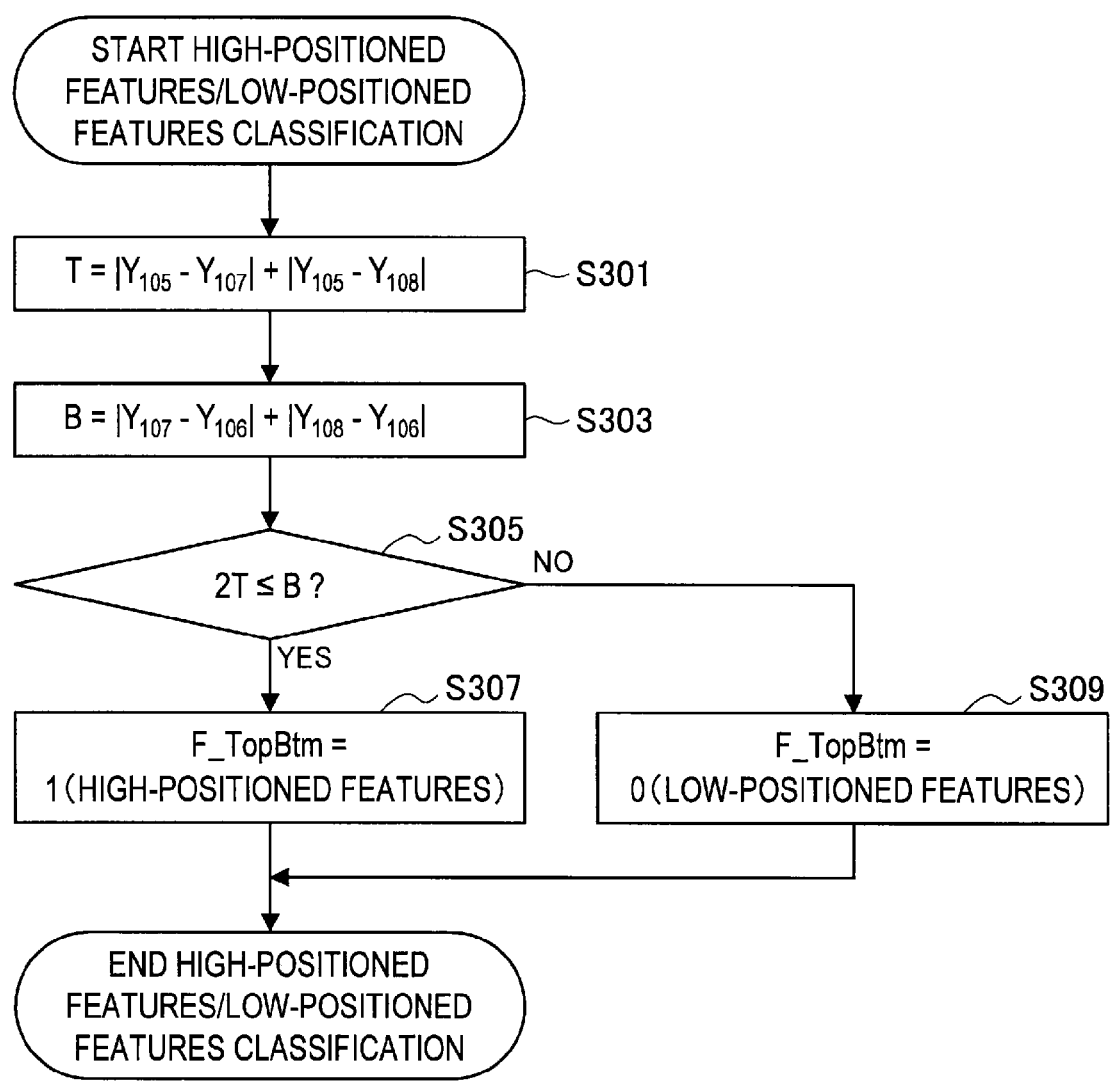
FIG. 11 is a flowchart that shows a differentiation algorithm in the high-positioned features/low-positioned features classification processing according to the present embodiment.

Next, the high-positioned features/low-positioned features classification processing by the high-positioned features/low-positioned features classification portion 353 at Step S107 will be explained with reference to FIGS. 10 and 11. FIG. 10 is an explanatory figure that shows the characteristic points that are used for the high-positioned features/low-positioned features classification according to the present embodiment. FIG. 11 is a flowchart that shows a differentiation algorithm in the high-positioned features/low-positioned features classification processing according to the present embodiment.

As shown in FIG. 10, in the high-positioned features/low-positioned features classification processing, the determining of the classification of the high-positioned features type and the low-positioned features type is made by using, as chosen reference points, from among the various characteristic points of the face that were identified at Step S103, the position information for the top edge of the forehead 105 (X axis coordinate=$X_{105}$, Y axis coordinate=$Y_{105}$), the bottom edge of the chin 106 (X axis coordinate=$X_{106}$, Y axis coordinate=$Y_{106}$), the top edge of the left eyehole 107 (X axis coordinate=$X_{107}$, Y axis coordinate=$Y_{107}$), and the top edge of the right eyehole 108 (X axis coordinate=$X_{108}$, Y axis coordinate=$Y_{108}$).

In FIG. 11, when the high-positioned features/low-positioned features classification processing is started, the position information that was acquired at Step S103 for the various reference points is referenced, and the high-positioned features/low-positioned features classification portion 353 computes a sum T of the absolute value of the difference between the Y axis coordinates for the top edge of the forehead 105 and the top edge of the left eyehole 107 ($|Y_{105}-Y_{107}|$) and the absolute value of the difference between the Y axis coordinates for the top edge of the forehead 105 and the top edge of the right eyehole 108 ($|Y_{105}-Y_{108}|$) (Step S301). Next, the high-positioned features/low-positioned features classification portion 353 computes a sum B of the absolute value of the difference between the Y axis coordinates for the top edge of the left eyehole 107 and the bottom edge of the chin 106 ($|Y_{107}-Y_{106}|$) and the absolute value of the difference between the Y axis coordinates for the top edge of the right eyehole 108 and the bottom edge of the chin 106 ($|Y_{108}-Y_{106}|$) (Step S303).

Next, the high-positioned features/low-positioned features classification portion 353 compares a value 2 T that is two times the sum T that was computed at Step S301 and the value B that was computed at Step S303 (Step S305). In a case where the value 2 T is not greater than the value B, the forehead is narrow, and the facial features as a whole are in a high position, so the determination is made that the face is the high-positioned features type, and the high-positioned features/low-positioned features classification portion 353 sets a high-positioned features/low-positioned features determination variable F_TopBtm to 1 (Step S307). On the other hand, in a case where the value 2 T is greater than the value B at Step S305, the forehead is wide, and the facial features as a whole are in a low position, so the determination is made that the face is the low-positioned features type, and the high-positioned features/low-positioned features classification portion 353 sets the high-positioned features/low-positioned features determination variable F_TopBtm to zero (Step S309).

Upturned Features/Downturned Features Classification Processing

Figure 12:
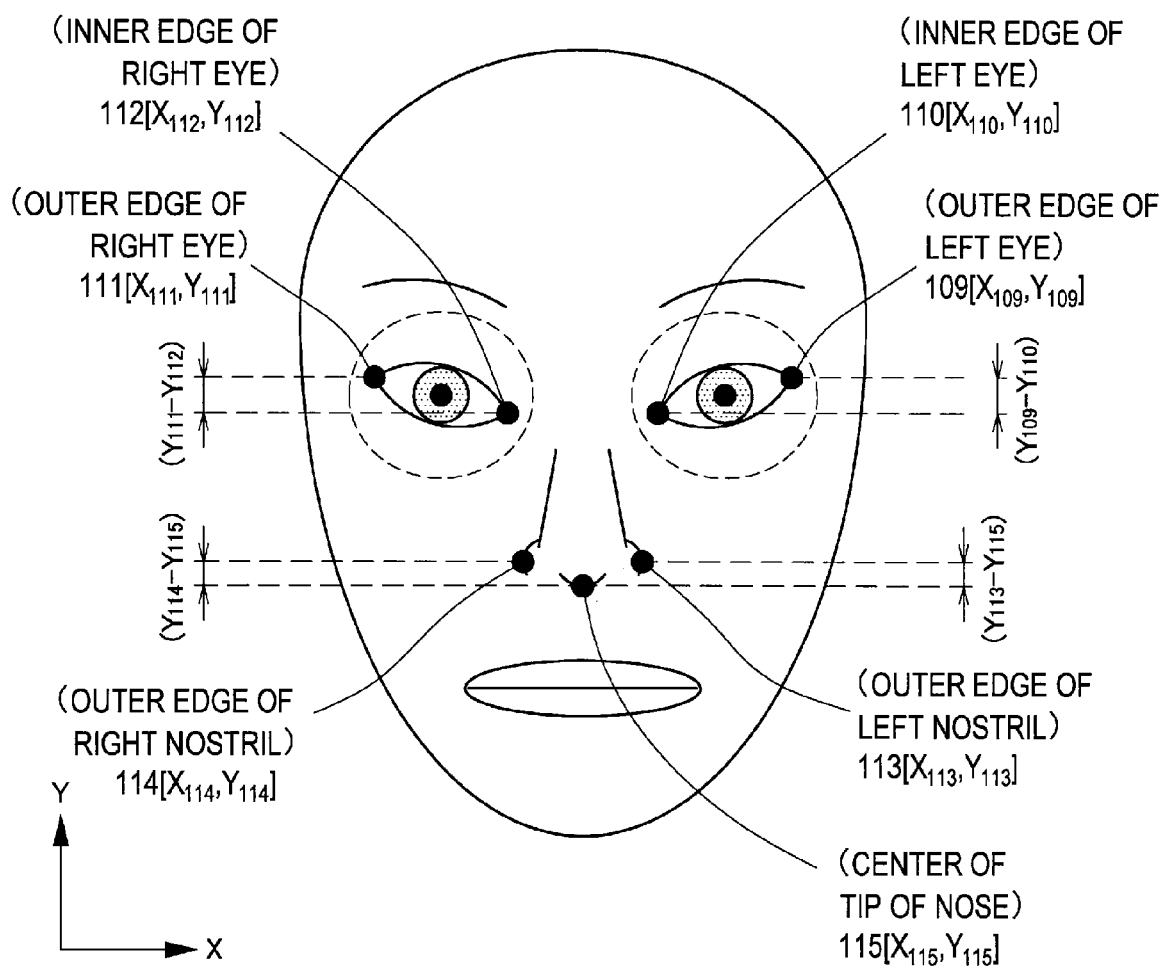
FIG. 12 is an explanatory figure that shows the characteristic points that are used for upturned features/downturned features classification according to the present embodiment.
Figure 13:
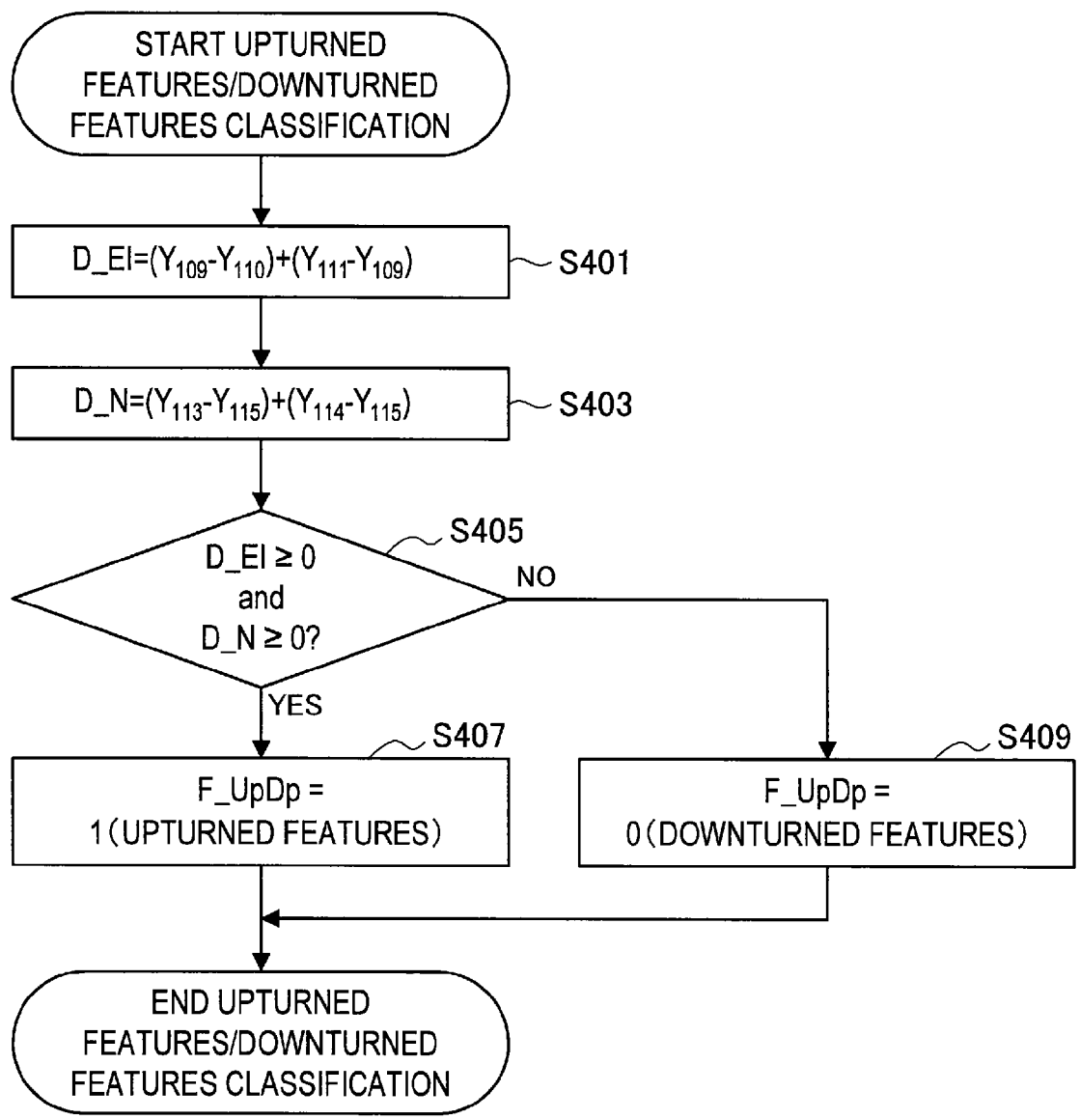
FIG. 13 is a flowchart that shows a differentiation algorithm in the upturned features/downturned features classification processing according to the present embodiment.

Next, the upturned features/downturned features classification processing by the upturned features/downturned features classification portion 355 at Step S109 will be explained with reference to FIGS. 12 and 13. FIG. 12 is an explanatory figure that shows the characteristic points that are used for the upturned features/downturned features classification according to the present embodiment. FIG. 13 is a flowchart that shows a differentiation algorithm in the upturned features/downturned features classification processing according to the present embodiment.

As shown in FIG. 12, in the upturned features/downturned features classification processing, the determining of the classification of the upturned features type and the downturned features type is made by using, as chosen reference points, from among the various characteristic points of the face that were identified at Step S103, the position information for the outer edge of the left eye 109 (X axis coordinate=$X_{109}$, Y axis coordinate=$Y_{109}$), the inner edge of the left eye 110 (X axis coordinate=$X_{110}$, Y axis coordinate=$Y_{110}$), the outer edge of the right eye 111 (X axis coordinate=$X_{111}$, Y axis coordinate=$Y_{111}$), the inner edge of the right eye 112 (X axis coordinate=$X_{112}$, Y axis coordinate=$Y_{112}$), the outer edge of the left nostril 113 (X axis coordinate=$X_{113}$, Y axis coordinate=$Y_{113}$), the outer edge of the right nostril 114 (X axis coordinate=$X_{114}$, Y axis coordinate=$Y_{114}$), and the center of the tip of the nose 115 (X axis coordinate=$X_{115}$, Y axis coordinate=$Y_{115}$).

In FIG. 13, when the upturned features/downturned features classification processing is started, the position information that was acquired at Step S103 for the various reference points that are described above is referenced, and the upturned features/downturned features classification portion 355 computes a sum D_EI of the difference between the Y axis coordinates for the outer edge of the left eye 109 and the inner edge of the left eye 110 ($Y_{109}-Y_{110}$) and the difference between the Y axis coordinates for the outer edge of the right eye 111 and the inner edge of the right eye 112 ($Y_{111}-Y_{112}$) (Step S401). Next, the upturned features/downturned features classification portion 355 computes a sum D_N of the difference between the Y axis coordinates for the outer edge of the left nostril 113 and the center of the tip of the nose 115 ($Y_{113}-Y_{115}$) and the difference between the Y axis coordinates for the outer edge of the right nostril 114 and the center of the tip of the nose 115 ($Y_{114}-Y_{115}$) (Step S403).

Next, the upturned features/downturned features classification portion 355 determines whether or not the value D_EI that was computed at Step S401 is not less than zero and whether or not the value D_N that was computed at Step S403 is not less than zero (Step S405). In a case where the value D_EI is not less than zero and the value D_N is not less than zero, the eyes are lifted up, the positions of the nostrils are higher than the tip of the nose, and the positions of the cheeks are high, so the determination is made that the face is the upturned features type, and the upturned features/downturned features classification portion 355 sets an upturned features/downturned features determination variable F_UpDp to 1 (Step S407). On the other hand, in a case where the value D_EI is less than zero or the value D_N is less than zero at Step S405, the corners of the eyes droop, the positions of the nostrils are lower than the tip of the nose, and the positions of the cheeks are low, so the determination is made that the face is the downturned features type, and the upturned features/downturned features classification portion 355 sets the upturned features/downturned features determination variable F_UpDp to zero (Step S409).

Facial Features Configuration Information Generation Processing

Next, the configuration information generation portion 37 performs configuration information generation processing for the facial features. The configuration information generation processing includes processing by the initial configuration information generation portion 371 that sets initial values for the positions of the facial features (Step S111), processing by the closely grouped features/widely spaced features enhancement processing portion 373 that enhances the positions according to whether the face has closely grouped features or widely spaced features (Step S113), processing by the high-positioned features/low-positioned features enhancement processing portion 375 that enhances the positions according to whether the face has high-positioned features or low-positioned features (Step S115), and processing by the upturned features/downturned features enhancement processing portion 377 that enhances the angles according to whether the face has upturned features or downturned features (Step S117). Hereinafter, the different types of processing will be explained in detail in order.

Setting of Initial Configuration

First, the initial configuration information generation portion 371 generates the initial configuration information that indicates the initial values for the configuration information. The initial configuration information is generated based on the position information for the characteristic points that have been identified by the characteristic point identification portion 33. The initial configuration information generation portion 371 generates the initial configuration information such that the various facial features are positioned within the facial outline in the way that the position information for the characteristic points indicates.

Figure 14:
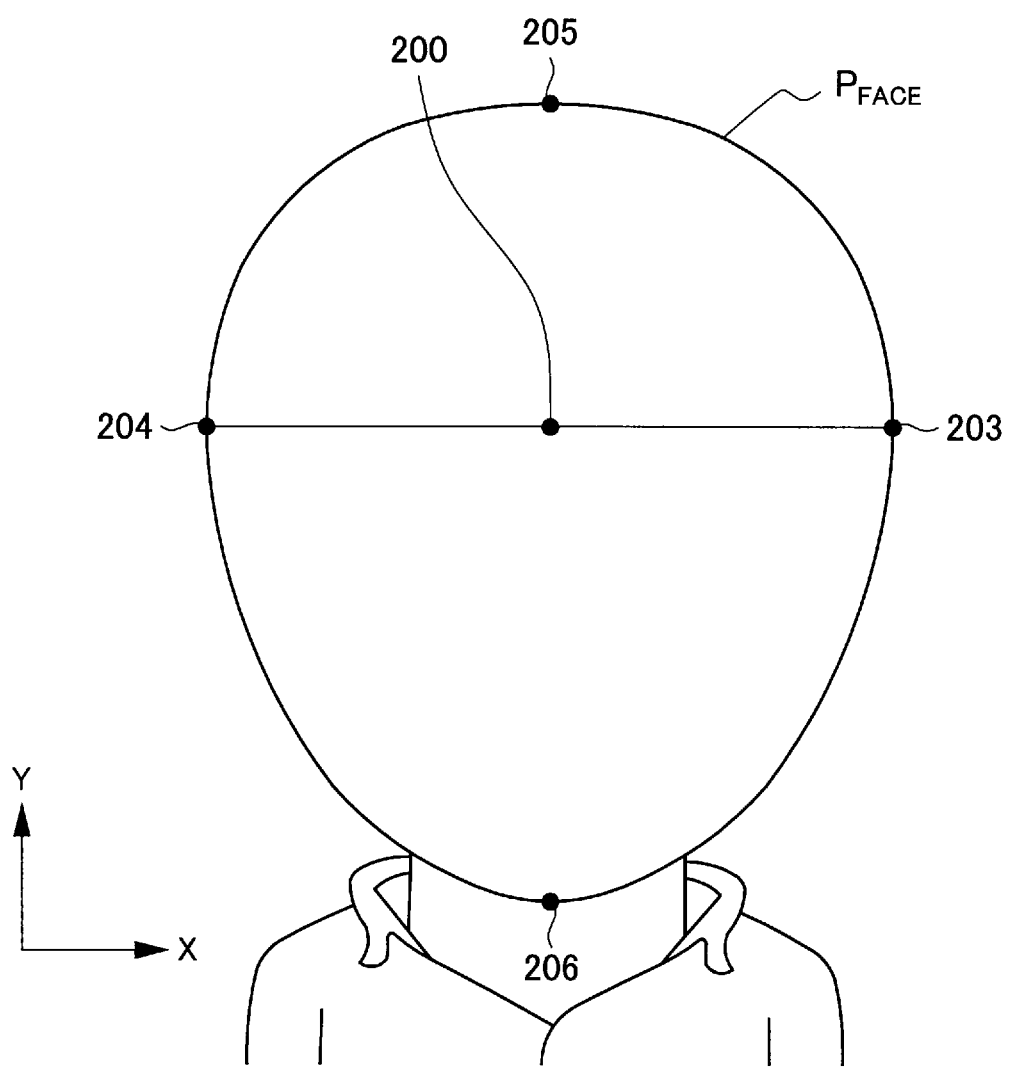
FIG. 14 is an explanatory figure that shows the characteristic points for a facial outline feature and a reference point position that are used in the present embodiment.
Figure 15:
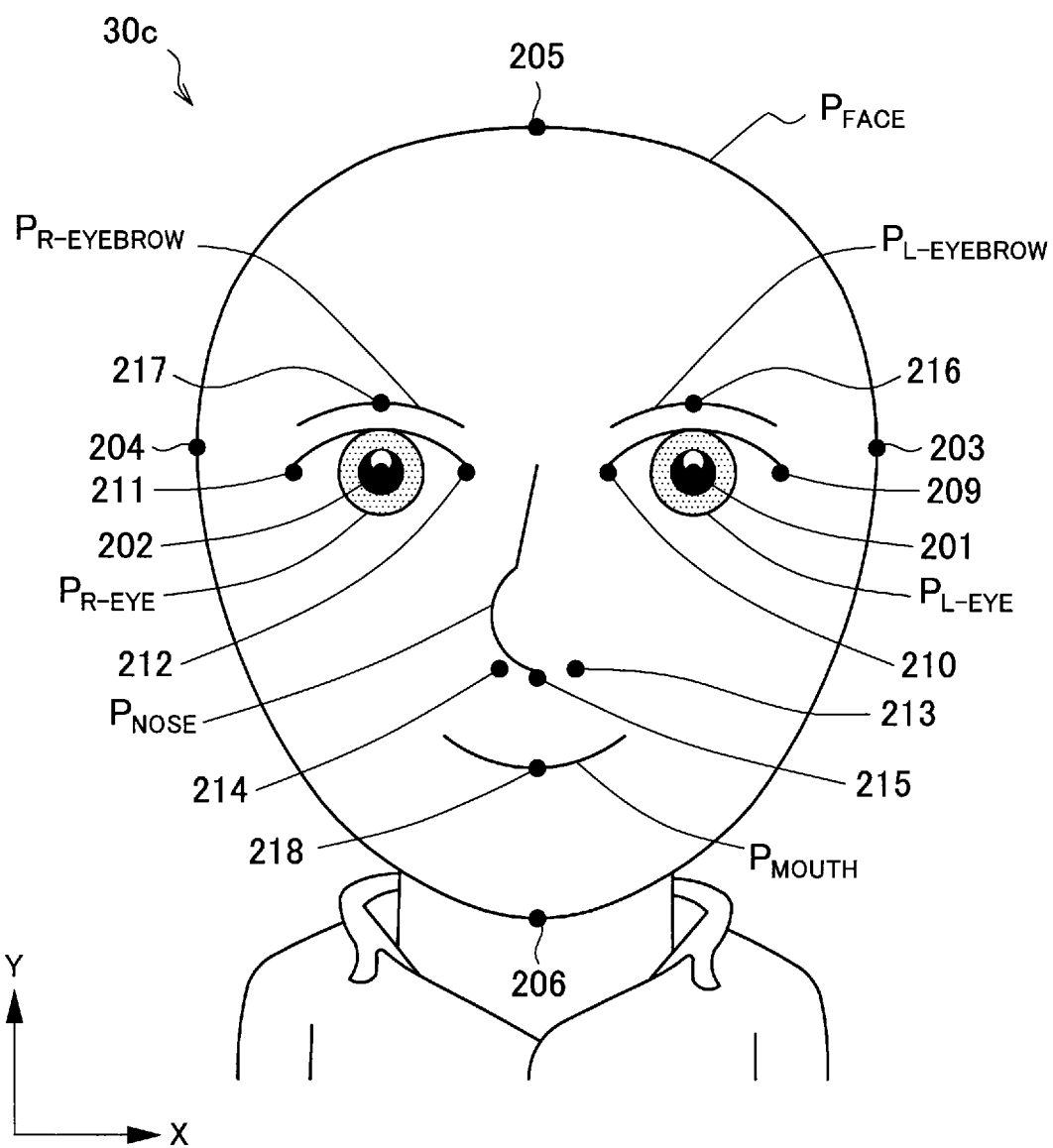
FIG. 15 is an explanatory figure that shows the characteristic points for various facial features that are used in the present embodiment.

For example, consider a case in which various facial features P that are shown in FIG. 15 are positioned in relation to a facial outline feature $P_{FACE}$ that is shown in FIG. 14. FIG. 14 is an explanatory figure that shows the characteristic points for the facial outline feature $P_{FACE}$ and a reference point position that are used in the present embodiment. FIG. 15 is an explanatory figure that shows the characteristic points for various facial features that are used in the present embodiment. Note that, as shown in FIG. 14, the positions of a left edge of the facial outline 203, a right edge of the facial outline 204, a top edge of the forehead 205, and a bottom edge of the chin 206 are set in advance for each of the facial outline features $P_{FACE}$. In addition, a reference point 200 that is the midpoint of a line that connects the left edge of the facial outline 203 and the right edge of the facial outline 204 is used in the positioning of the various facial features P.

Referring to FIG. 15, in the present embodiment, a left eyebrow feature $P_{L-EYEBROW}$, a right eyebrow feature $P_{R-EYEBROW}$, a left eye feature $P_{L-EYE}$, a right eye feature $P_{R-EYE}$, a nose feature $P_{NOSE}$, and a mouth feature $P_{MOUTH}$ are positioned in relation to the facial outline feature $P_{FACE}$.

Here, the characteristic points that are used in generating the configuration information are the characteristic points that correspond to the characteristic points in the facial image that have been identified by the characteristic point identification portion 33 (refer to FIG. 7). The positions of the characteristic points for which the facial outline feature $P_{FACE}$ serves as the reference are hereinafter shown as a center of the left pupil 201, a center of the right pupil 202, the left edge of the facial outline 203, the right edge of the facial outline 204, the top edge of the forehead 205, the bottom edge of the chin 206, a top edge of the left eyehole 207, a top edge of the right eyehole 208, an outer edge of the left eye 209, an inner edge of the left eye 210, an outer edge of the right eye 211, an inner edge of the right eye 212, an outer edge of the left nostril 213, an outer edge of the right nostril 214, a center of the tip of the nose 215, a center of the left eyebrow 216, a center of the right eyebrow 217, and a center of the mouth 218. Note that the position information for the center of the left pupil 201, for example, is expressed as $[X_{201}, Y_{201}]$.

The initial configuration information can include, for example, position information that is derived by the computations that are described below. For example, the horizontal axis position of the reference point 200 is indicated by $X_{200}=(X_{203}+X_{204})/2$. The vertical axis position of a center point between the eyes in the facial image is indicated by $Y_{100}=(Y_{101}+Y_{102})/2$. The vertical axis position of a center point between the eyebrows in the facial image is indicated by $Y_{119}=(Y_{116}+Y_{117})/2$.

Based on the definitions above, the position of the left eye is derived by the formulas below.

$$X_{201}=X_{200}+|X_{203}-X_{204}|/2*|X_{101}-X_{102}|/|X_{103}-X_{104}|$$

$$Y_{201}=Y_{206}+|Y_{205}-Y_{206}|*|Y_{100}-Y_{106}|/|Y_{105}-Y_{106}|$$

Further, the position of the right eye is derived by the formulas below.

$$X_{202}=X_{200}-|X_{203}-X_{204}|/2*|X_{101}-X_{102}|/|X_{103}-X_{104}|$$

$$Y_{202}=Y_{201}$$

Note that here, the position data for the outer edge 209 and the inner edge 210 of the left eye, the outer edge 211 and the inner edge 212 of the right eye are determined in advance for the eye features.

Further, the position of the left eyebrow is derived by the formulas below.

$$X_{216}=X_{200}-|X_{203}-X_{204}|/2*|X_{116}-X_{117}|/|X_{103}-X_{104}|$$

$$Y_{216}=Y_{206}-|Y_{205}-Y_{206}|*|Y_{119}-Y_{106}|/|Y_{105}-Y_{106}|$$

The position of the right eyebrow is derived by the formulas below.

$$X_{217}=X_{200}-|X_{203}-X_{204}|/2*|X_{116}-X_{117}|/|X_{103}-X_{104}|$$

$$Y_{217}=Y_{201}$$

The position of the nose is derived by the formulas below.

$$X_{215}=X_{200}$$

$$Y_{215}=Y_{206}+|Y_{205}-Y_{206}|*|Y_{115}-Y_{106}|/|Y_{105}<Y_{106}|$$

The position of the mouth is derived by the formulas below.

$$X_{218} = X_{200}$$

$$Y_{218} = Y_{206} + |Y_{205} - Y_{206}| * |Y_{118} - Y_{106}| / |Y_{105} - Y_{106}|$$

The initial configuration information that includes the initial position information for the various facial features is generated based on the formulas that are shown above. Various forms of the enhancement processing, which will be described later, are performed on the initial configuration information.

Closely grouped features/widely spaced features enhancement processing

Figure 16:
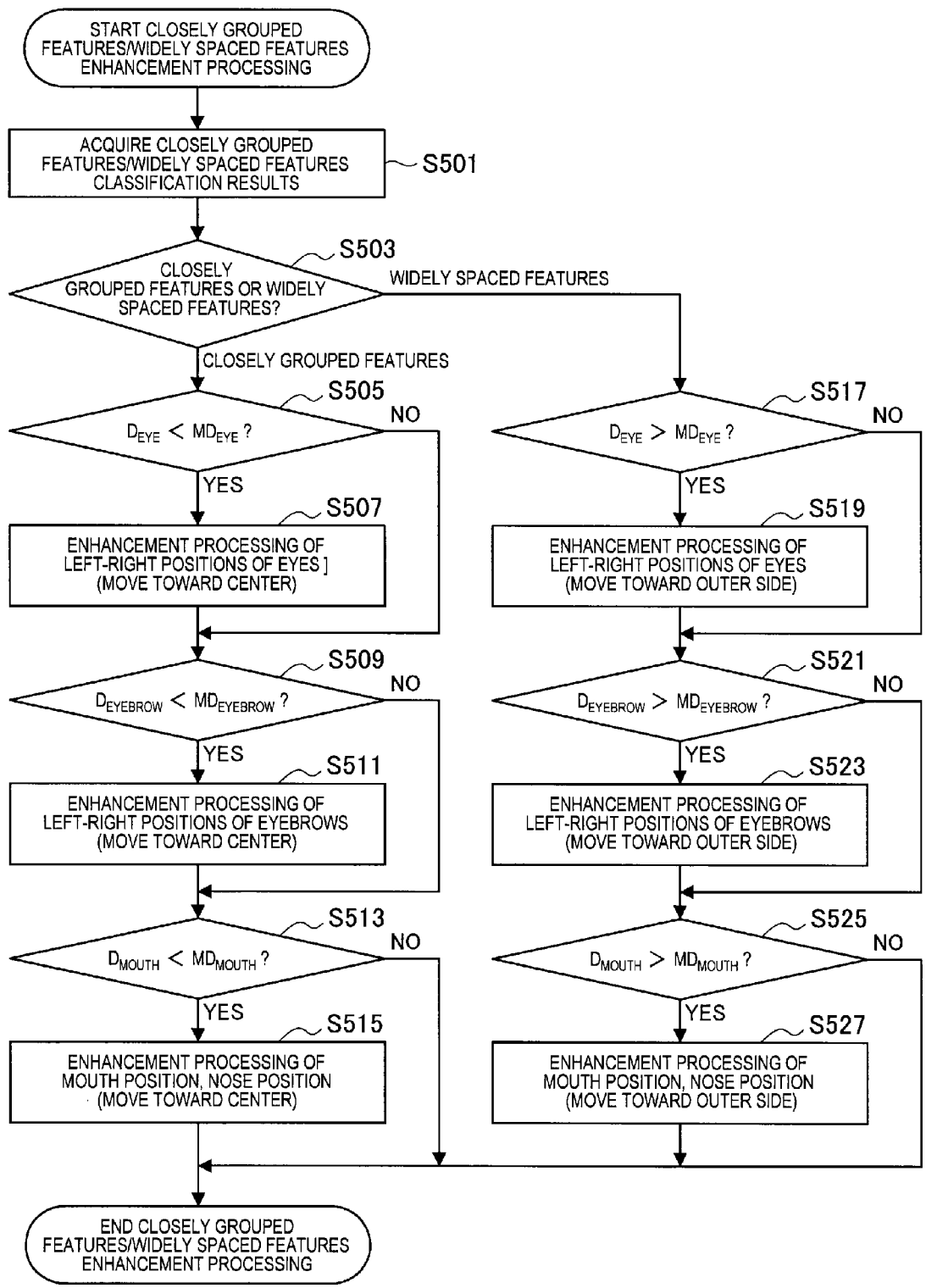
FIG. 16 is a flowchart that shows a flow of closely grouped features/widely spaced features enhancement processing according to the present embodiment.

First, the closely grouped features/widely spaced features enhancement processing is performed by the closely grouped features/widely spaced features enhancement processing portion 373. The flow of the closely grouped features/widely spaced features enhancement processing is shown in FIG. 16. FIG. 16 is a flowchart that shows the flow of the closely grouped features/widely spaced features enhancement processing according to the present embodiment.

First, the closely grouped features/widely spaced features enhancement processing portion 373 acquires the closely grouped features/widely spaced features classification results, which are the results of the classification by the closely grouped features/widely spaced features classification portion 351 (Step S501). Then the closely grouped features/widely spaced features enhancement processing portion 373 determines whether the classification results indicate the closely grouped features type or the widely spaced features type (Step S503).

In a case where it has been determined at Step S503 that the face is the closely grouped features type, the closely grouped features/widely spaced features enhancement processing portion 373 then compares the distance between the left and right eyes ($D_{EYE} = |X_{101} - X_{102}| / |X_{103} - X_{104}|$) to an average value $MD_{EYE}$ for the distance between the left and right eyes, which is determined in advance (Step S505). In a case where $D_{EYE}$ is less than $MD_{EYE}$, the closely grouped features/widely spaced features enhancement processing portion 373 then performs the enhancement processing for the left-right positions of the eyes (Step S507).

Next, the closely grouped features/widely spaced features enhancement processing portion 373 then compares the distance between the left and right eyebrows in relation to the horizontal width of the face ($D_{EYEBROW} = |X_{116} - X_{117}| / |X_{103} - X_{104}|$) to an average value $MD_{EYEBROW}$ for the distance between the left and right eyebrows, which is determined in advance (Step S509). In a case where $D_{EYEBROW}$ is less than $MD_{EYEBROW}$, the closely grouped features/widely spaced features enhancement processing portion 373 then performs the enhancement processing for the left-right positions of the eyebrows (Step S511).

Next, the closely grouped features/widely spaced features enhancement processing portion 373 then compares the distance between the mouth and the chin in relation to the vertical length of the face ($D_{MOUTH} = |Y_{118} - Y_{106}| / |Y_{105} - Y_{106}|$) to an average value $MD_{MOUTH}$ for the distance between the mouth and the chin, which is determined in advance (Step S513). In a case where $D_{MOUTH}$ is less than $MD_{MOUTH}$, the closely grouped features/widely spaced features enhancement processing portion 373 then performs the enhancement processing for the mouth position and the nose position (Step S515).

On the other hand, in a case where it has been determined at Step S503 that the face is the widely spaced features type, the closely grouped features/widely spaced features enhancement processing portion 373 then compares the distance between the left and right eyes ($D_{EYE} = |X_{101} - X_{102}| / |X_{103} - X_{104}|$) to the average value $MD_{EYE}$ for the distance between the left and right eyes, which is determined in advance (Step S517). In a case where $D_{EYE}$ is greater than $MD_{EYE}$, the closely grouped features/widely spaced features enhancement processing portion 373 then performs the enhancement processing for the left-right positions of the eyes (Step S519).

Next, the closely grouped features/widely spaced features enhancement processing portion 373 then compares the distance between the left and right eyebrows in relation to the horizontal width of the face ($D_{EYEBROW} = |X_{116} - X_{117}| / |X_{103} - X_{104}|$) to the average value $MD_{EYEBROW}$ for the distance between the left and right eyebrows, which is determined in advance (Step S521). In a case where $D_{EYEBROW}$ is greater than $MD_{EYEBROW}$, the closely grouped features/widely spaced features enhancement processing portion 373 then performs the enhancement processing for the left-right positions of the eyebrows (Step S523).

Next, the closely grouped features/widely spaced features enhancement processing portion 373 compares the distance between the mouth and the chin in relation to the vertical length of the face ($D_{MOUTH} = |Y_{118} - Y_{106}| / |Y_{105} - Y_{106}|$) to the average value $MD_{MOUTH}$ for the distance between the mouth and the chin, which is determined in advance (Step S525). In a case where $D_{MOUTH}$ is greater than processing portion 373 then performs the enhancement processing for the mouth position and the nose position (Step S527).

Here, the positions of the eye features that are included in the configuration information that is modified at Step S507 and Step S519 are derived by the computations below. Here, a value that indicates the degree of the enhancement is defined as F.

$$X_{201} = X_{201} + F * (D_{EYE} - MD_{EYE})$$

$$Y_{201} = Y_{201}$$

$$X_{202} = X_{202} - F * (D_{EYE} - MD_{EYE})$$

$$Y_{202} = Y_{202}$$

Further, the positions of the eyebrow features that are included in the configuration information that is modified at Step S511 and Step S523 are derived by the computations below.

$$X_{216} = X_{216} + F * (D_{EYEBROW} - MD_{EYEBROW})$$

$$Y_{216} = Y_{216}$$

$$X_{217} = X_{217} - F * (D_{EYEBROW} - MD_{EYEBROW})$$

$$Y_{217} = Y_{217}$$

Further, the position of the mouth feature that is included in the configuration information that is modified at Step S515 and Step S527 is derived by the computations below.

$$X_{218} = X_{218}$$

$$Y_{218} = Y_{218} + F * (D_{MOUTH} - MD_{MOUTH})$$

Here, the position of the nose feature is modified in conjunction with the mouth feature. The position of the nose feature is derived by the computations below.

$$X_{215} = X_{215}$$

$$Y_{215} = Y_{218} + (Y_{201} - Y_{218}) * (Y_{215} - Y_{218}) / (Y_{201} - Y_{218})$$

Figure 17:
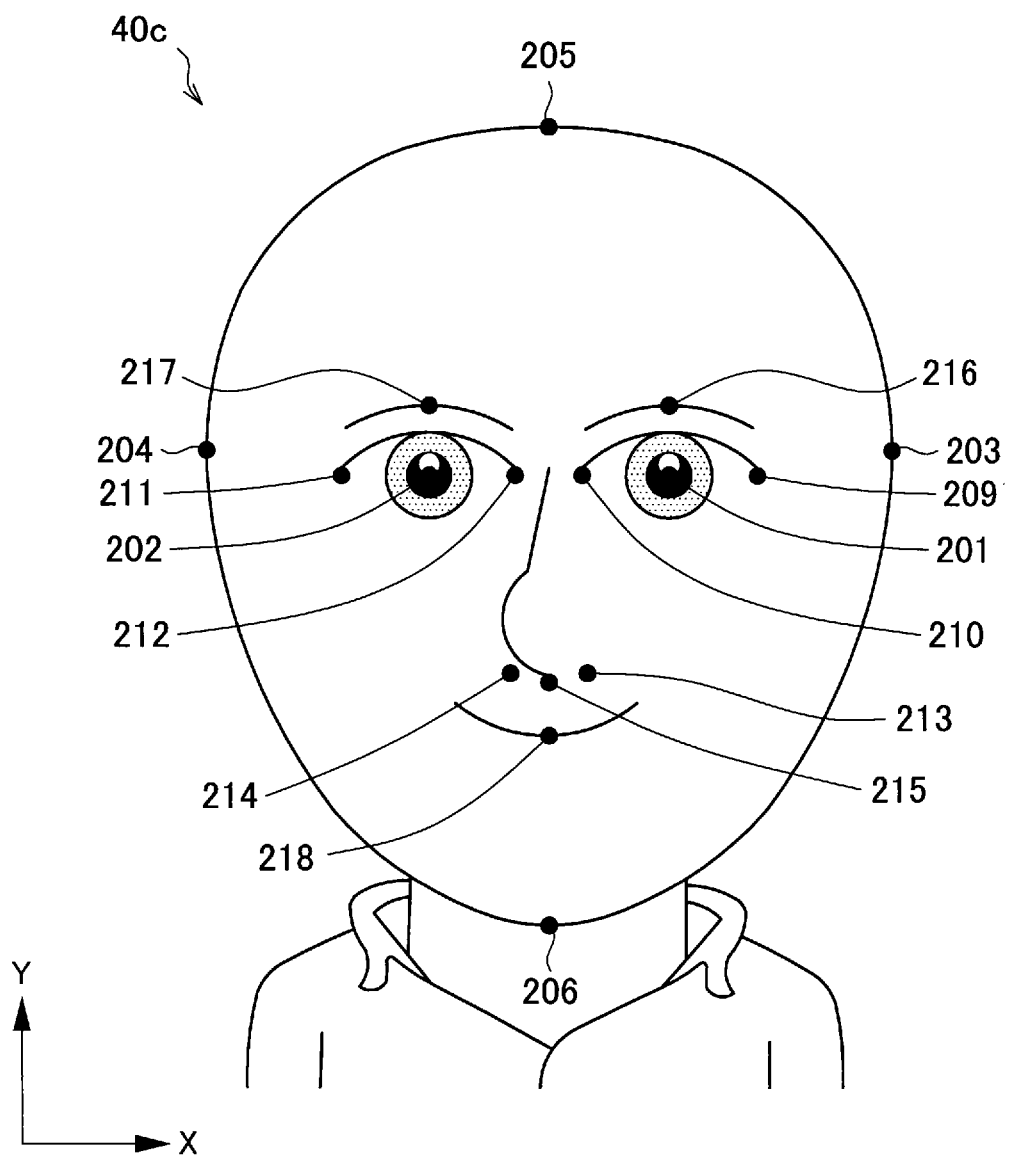
FIG. 17 is an explanatory figure that shows an example of results of the closely grouped features enhancement processing according to the present embodiment.
Figure 18:
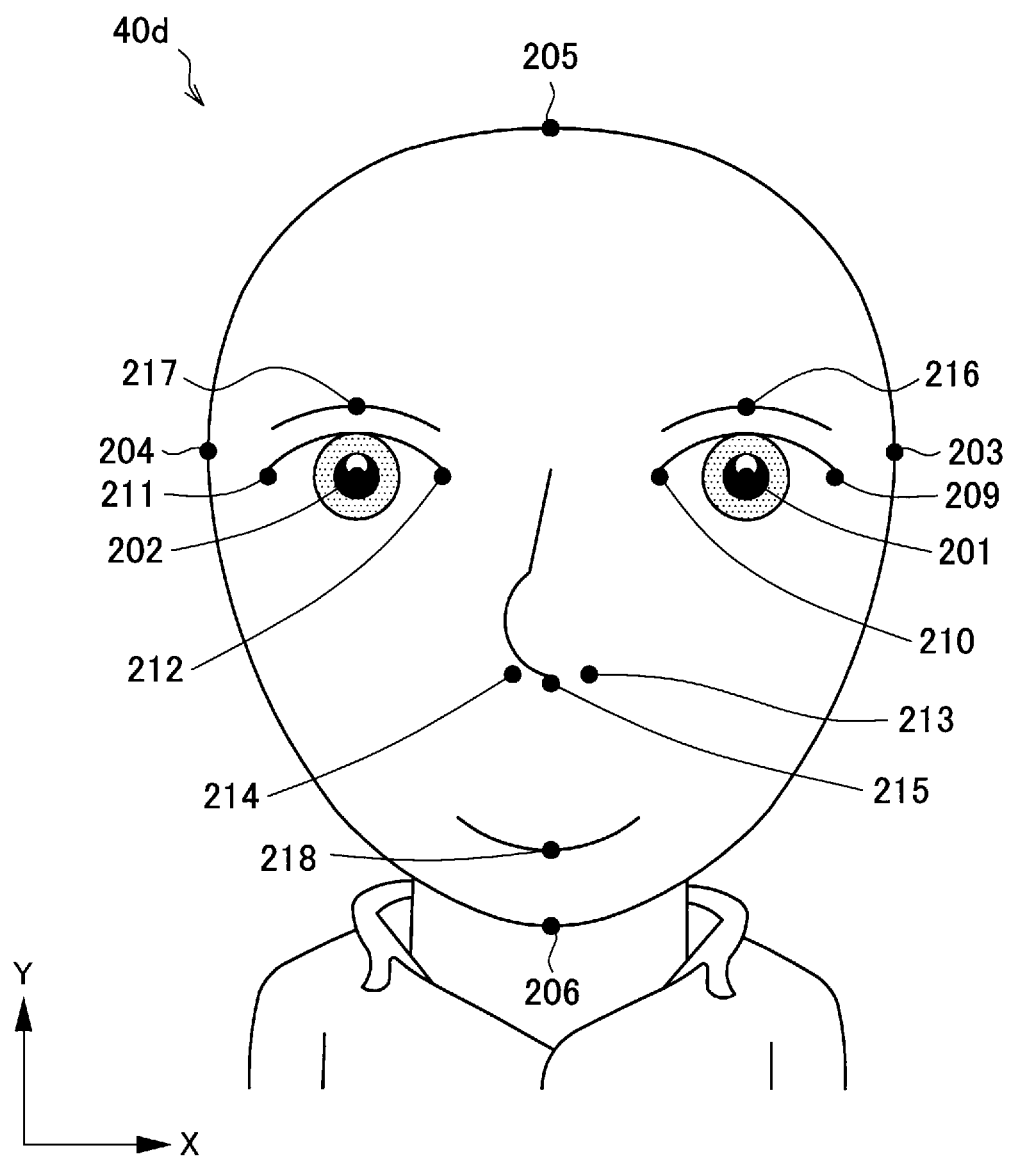
FIG. 18 is an explanatory figure that shows an example of results of the widely spaced features enhancement processing according to the present embodiment.

Note that an example of the configuration of the various facial features after the enhancement processing in a case where the face was determined to be the closely grouped features type is shown in FIG. 17. FIG. 17 is an explanatory figure that shows an example of the results of the closely grouped features enhancement processing according to the present embodiment. As shown in FIG. 17, the characteristics of the various facial features that are positioned within the facial outline are enhanced by modifying their positions such that the features are moved toward the center of the face. In contrast, FIG. 18 shows an example of the configuration of the facial features after the enhancement processing in a case where the face was determined to be the widely spaced features type. FIG. 18 is an explanatory figure that shows an example of the results of the widely spaced features enhancement processing according to the present embodiment. As shown in FIG. 18, the characteristics of the various facial features that are positioned within the facial outline are enhanced by modifying their positions such that the features are moved toward the outer side of the face.

High-positioned features/low-positioned features enhancement processing

Figure 19:
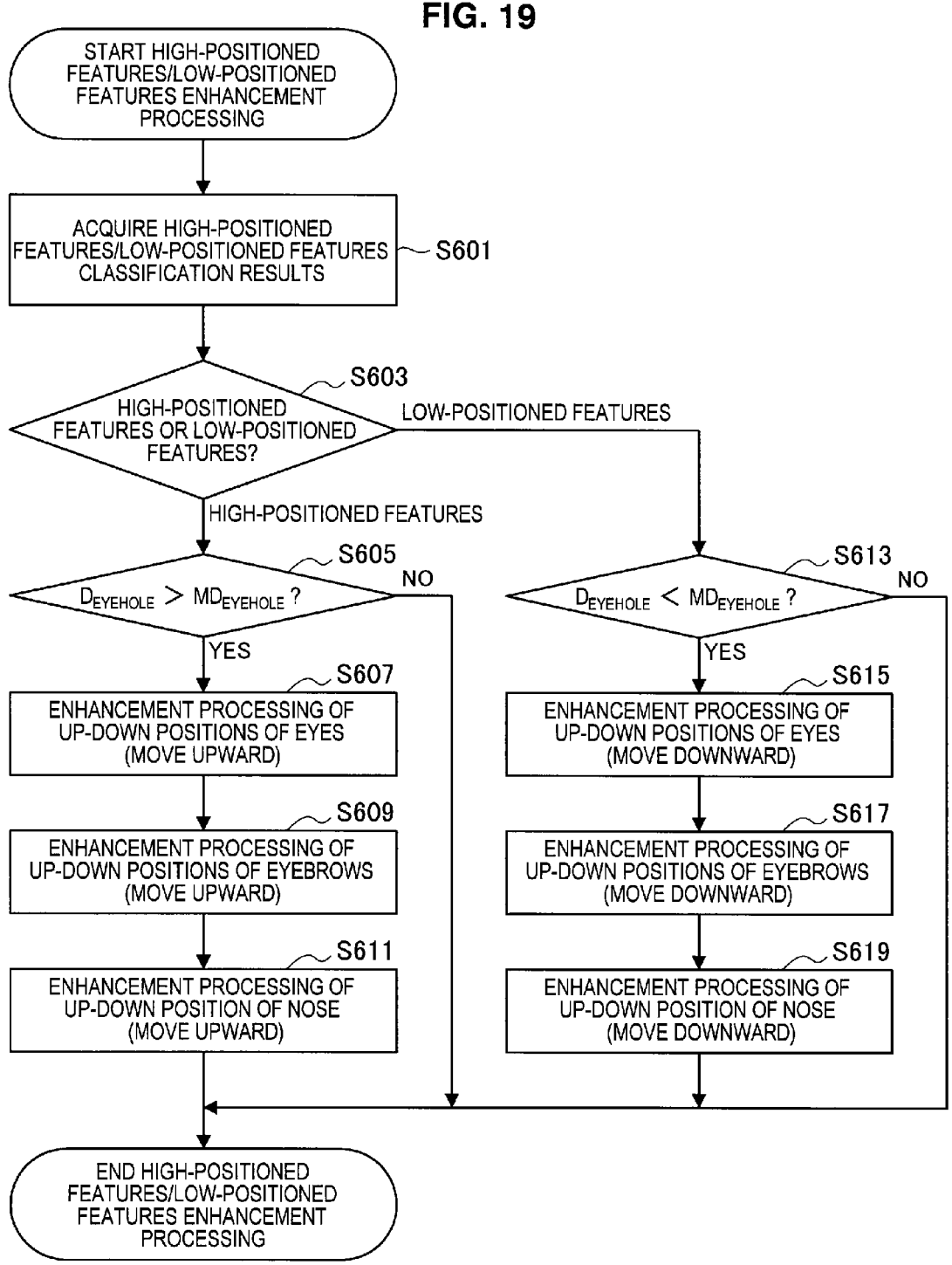
FIG. 19 is a flowchart that shows a flow of high-positioned features/low-positioned features enhancement processing according to the present embodiment.

Next, the high-positioned features/low-positioned features enhancement processing is performed by the high-positioned features/low-positioned features enhancement processing portion 375. The flow of the high-positioned features/low-positioned features enhancement processing is shown in FIG. 19. FIG. 19 is a flowchart that shows the flow of the high-positioned features/low-positioned features enhancement processing according to the present embodiment.

First, the high-positioned features/low-positioned features enhancement processing portion 375 acquires the high-positioned features/low-positioned features classification results, which are the results of the classification by the high-positioned features/low-positioned features classification portion 353 (Step S601). Then the high-positioned features/low-positioned features enhancement processing portion 375 determines whether the classification results indicate the high-positioned features type or the low-positioned features type (Step S603).

In a case where it has been determined at Step S603 that the face is the high-positioned features type, the high-positioned features/low-positioned features enhancement processing portion 375 then compares the distance between the eyeholes and the chin in relation to the vertical length of the face ($D_{EYEHOLE} = |(Y_{116}+Y_{117})/2 - Y_{106}|/|Y_{105} - Y_{106}|$) to an average value $MD_{EYEHOLE}$ for the distance between the eyeholes and the chin in relation to the vertical length of the face, which is determined in advance (Step S605). In a case where $D_{EYEHOLE}$ is greater than $MD_{EYEHOLE}$, the high-positioned features/low-positioned features enhancement processing portion 375 then performs the enhancement processing for the up-down positions of the eyes (Step S607), the enhancement processing for the up-down positions of the eyebrows (Step S609), and the enhancement processing for the up-down position of the nose (Step S611).

In contrast, in a case where it has been determined at Step S603 that the face is the low-positioned features type, the high-positioned features/low-positioned features enhancement processing portion 375 then compares the distance between the eyeholes and the chin in relation to the vertical length of the face ($D_{EYEHOLE} = |(Y_{116}+Y_{117})/2 - Y_{106}|/|Y_{105} - Y_{106}|$) to the average value $MD_{EYEHOLE}$ for the distance between the eyeholes and the chin in relation to the vertical length of the face, which is determined in advance (Step S613). In a case where $D_{EYEHOLE}$ is less than $MD_{EYEHOLE}$, the high-positioned features/low-positioned features enhancement processing portion 375 then performs the enhancement processing for the up-down positions of the eyes (Step S615), the enhancement processing for the up-down positions of the eyebrows (Step S617), and the enhancement processing for the up-down position of the nose (Step S619).

Here, the positions of the eye features that are included in the configuration information that is modified at Step S607 and Step S615 are derived by the computations below.

$$X_{201} = X_{201}$$

$$Y_{201} = Y_{201} + F^*(D_{EYEHOLE} - MD_{EYEHOLE})$$

$$X_{202} = X_{202}$$

$$Y_{202} = Y_{202} + F^*(D_{EYEHOLE} - MD_{EYEHOLE})$$

Further, the positions of the eyebrow features that are included in the configuration information that is modified at Step S609 and Step S617 are derived by the computations below.

$$X_{216} = X_{216}$$

$$Y_{216} = Y_{206} + |Y_{201} - Y_{206}|^*|Y_{119} - Y_{106}|/|Y_{101} - Y_{106}|$$

$$X_{217} = X_{217}$$

$$Y_{217} = Y_{216}$$

Further, the position of the nose feature that is included in the configuration information that is modified at Step S611 and Step S619 is derived by the computations below.

$$X_{215} = X_{215}$$

$$Y_{215} = Y_{218} + (Y_{201} - Y_{218})^*(Y_{215} - Y_{218})/(Y_{201} - Y_{218})$$

Figure 20:
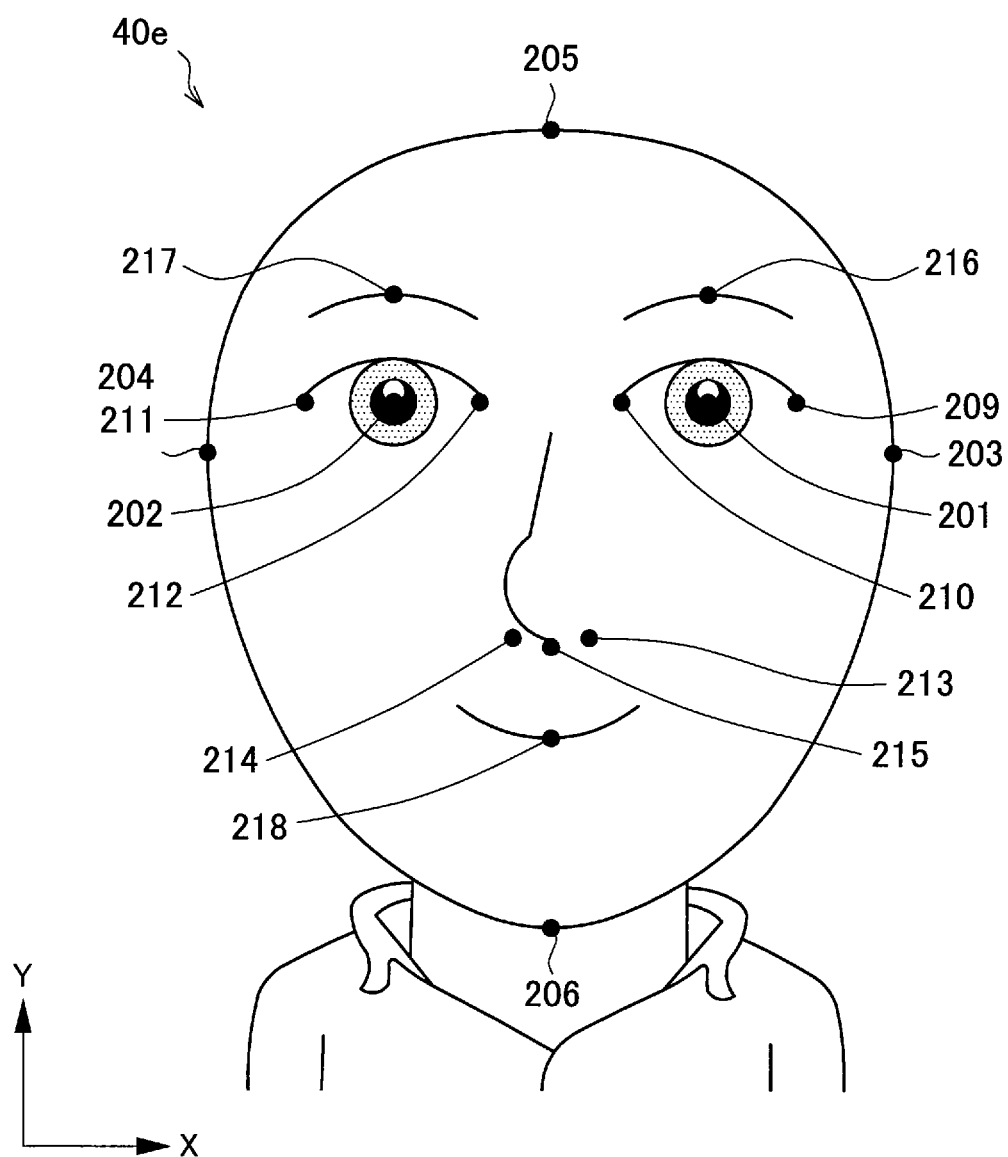
FIG. 20 is an explanatory figure that shows an example of results of the high-positioned features enhancement processing according to the present embodiment.
Figure 21:
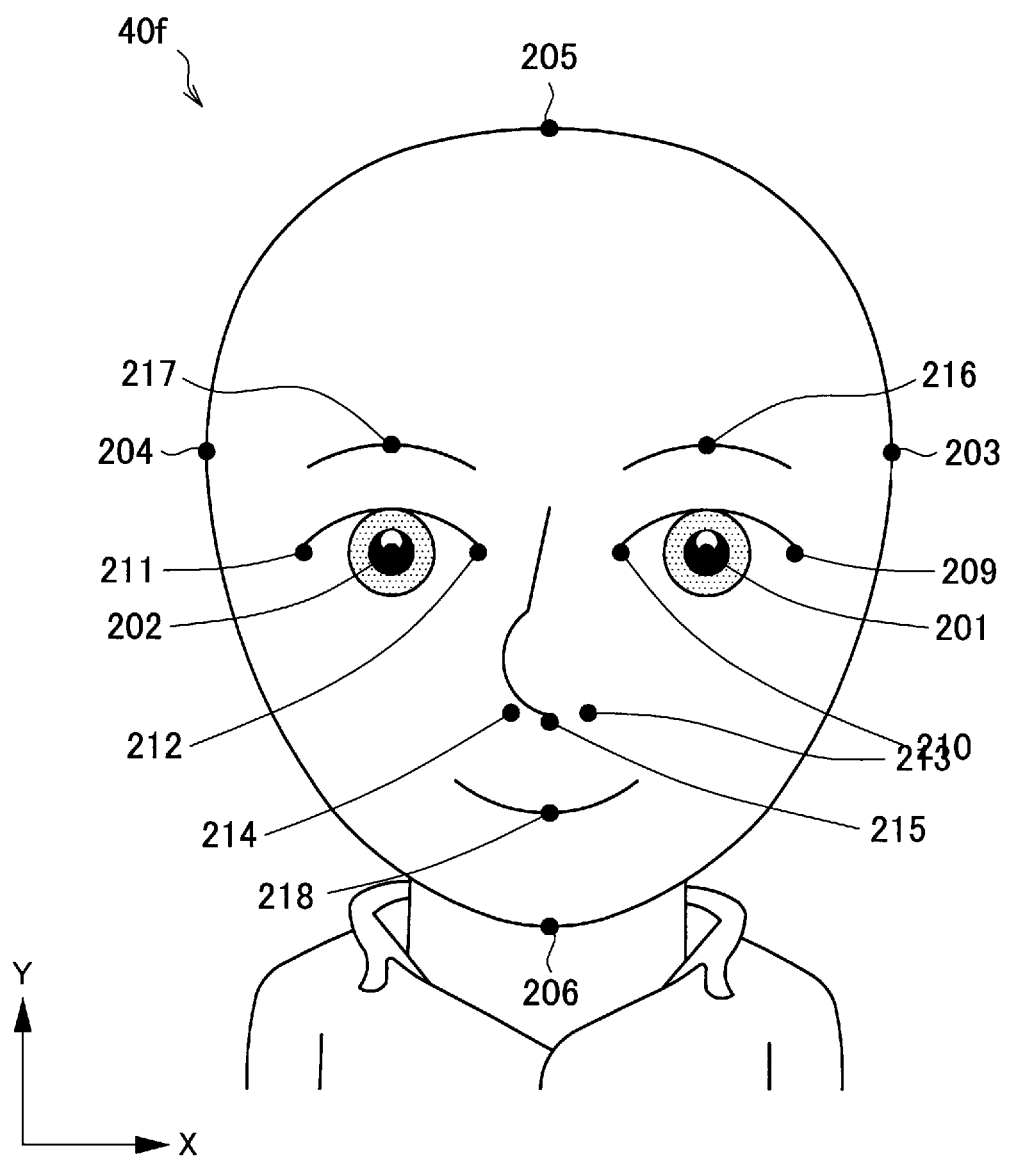
FIG. 21 is an explanatory figure that shows an example of results of the low-positioned features enhancement processing according to the present embodiment.

Note that an example of the configuration of the various facial features after the enhancement processing in a case where the face was determined to be the high-positioned features type is shown in FIG. 20. FIG. 20 is an explanatory figure that shows an example of the results of the high-positioned features enhancement processing according to the present embodiment. As shown in FIG. 20, the characteristics of the various facial features that are positioned within the facial outline are enhanced by modifying their positions such that the features are moved toward the upper side of the face. In contrast, an example of the configuration of the facial features after the enhancement processing in a case where the face was determined to be the low-positioned features type is shown in FIG. 21. FIG. 21 is an explanatory figure that shows an example of the results of the low-positioned features enhancement processing according to the present embodiment. As shown in FIG. 21, the characteristics of the various facial features that are positioned within the facial outline are enhanced by modifying their positions such that the features are moved toward the lower side of the face. Note that in the high-positioned features/low-positioned features enhancement processing, the positions of the eyebrows and the position of the nose are modified in conjunction with the positions of the eyes.

Upturned Features/Downturned Features Enhancement Processing

Figure 22:
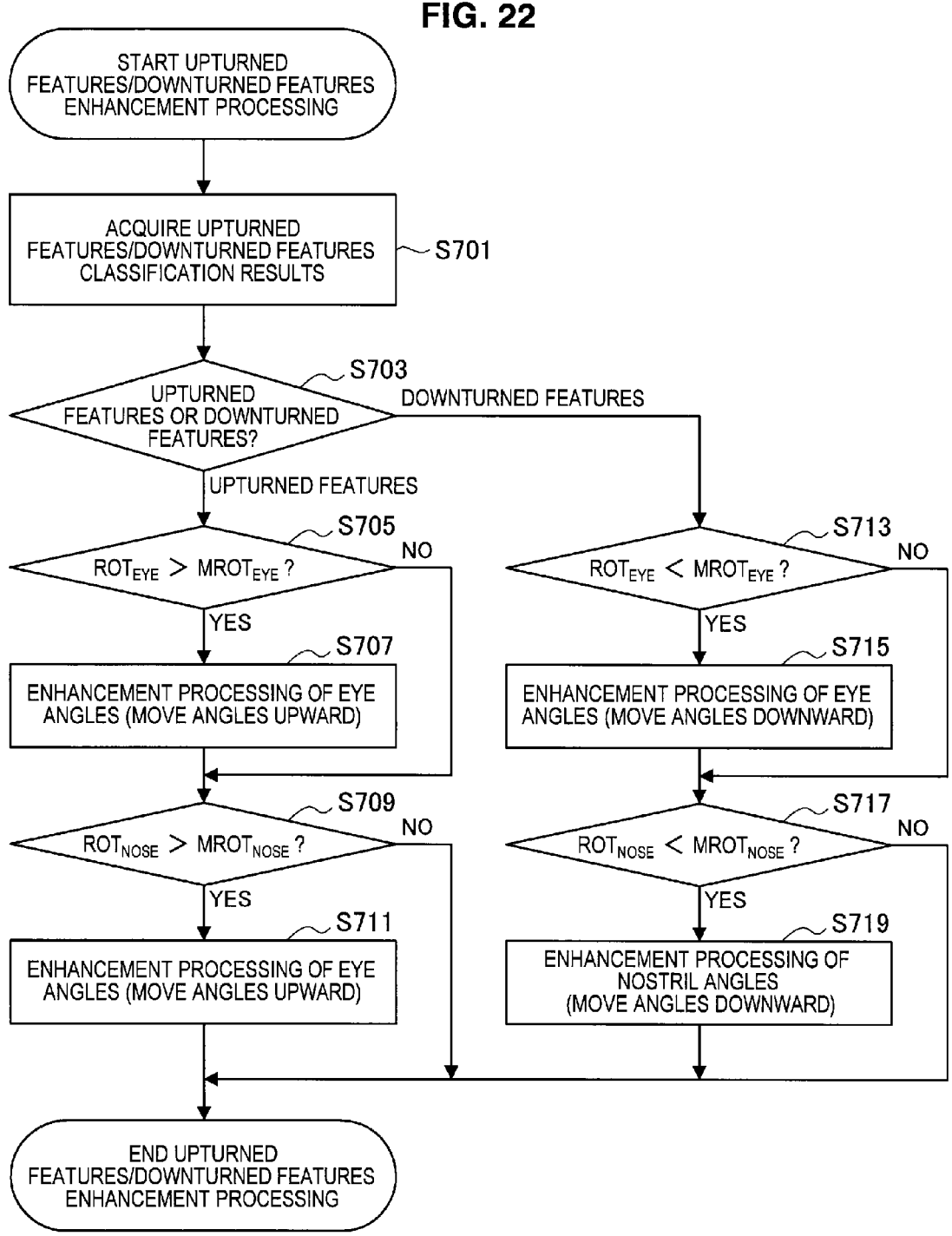
FIG. 22 is a flowchart that shows a flow of upturned features/downturned features enhancement processing according to the present embodiment.

Next, the upturned features/downturned features enhancement processing is performed by the upturned features/downturned features enhancement processing portion 377. The flow of the upturned features/downturned features enhancement processing is shown in FIG. 22. FIG. 22 is a flowchart that shows the flow of the upturned features/downturned features enhancement processing according to the present embodiment.

First, the upturned features/downturned features enhancement processing portion 377 acquires the upturned features/downturned features classification results, which are the results of the classification by the upturned features/downturned features classification portion 355 (Step S701). Then the upturned features/downturned features enhancement processing portion 377 determines whether the classification results indicate the upturned features type or the downturned features type (Step S703).

In a case where it has been determined at Step S703 that the face is the upturned features type, the upturned features/downturned features enhancement processing portion 377 then obtains, from the position information for the characteristic points that has been acquired from the facial image, a left eye angle $ROT_{LEYE}$ and a right eye angle $ROT_{REYE}$ that satisfy the conditions below.

$$LEN_{LEYE}=SQRT(POW(X_{109}-X_{110},2)+POW(Y_{109}-Y_{110},2))$$

$$COS(ROT_{LEYE})=(|(X_{109}-X_{110})|/LEN_{LEYE}$$

$$SIN(ROT_{LEYE})=(|(Y_{109}-Y_{110})|/LEN_{LEYE}$$

$$LEN_{REYE}=SQRT(POW(X_{111}-X_{112},2)+POW(Y_{111}-Y_{112},2))$$

$$COS(ROT_{REYE})=(|(X_{111}-X_{112})|/LEN_{REYE}$$

$$SIN(ROT_{REYE})=(|(Y_{111}-Y_{112})|/LEN_{REYE}$$

Next, the upturned features/downturned features enhancement processing portion 377 compares an average angle for the left and right eyes $(ROT_{EYE}=(ROT_{LEYE}+ROT_{REYE})/2)$ to an average value $MROT_{EYE}$ for the average angle for the left and right eyes (for a plurality of users), which is determined in advance (Step S705). In a case where $ROT_{EYE}$ is greater than $MROT_{EYE}$ at Step S705, the upturned features/downturned features enhancement processing portion 377 then performs the enhancement processing for the eye angles (Step S707).

Next, the upturned features/downturned features enhancement processing portion 377 obtains, from the position information for the characteristic points that has been acquired from the facial image, a left nostril angle $ROT_{LNOSE}$ and a right nostril angle $ROT_{RNOSE}$ that satisfy the conditions below.

$$LEN_{LNOSE}=SQRT(POW(X_{113}-X_{115},2)+POW(Y_{113}-Y_{115},2))$$

$$COS(ROT_{LNOSE})=(|(X_{113}-X_{115})|/LEN_{LNOSE}$$

$$SIN(ROT_{LNOSE})=(|(Y_{113}-Y_{115})|/LEN_{LNOSE}$$

$$LEN_{RNOSE}=SQRT(POW(X_{114}-X_{115},2)+POW(Y_{114}-Y_{115},2))$$

$$COS(ROT_{RNOSE})=(|(X_{114}-X_{115})|/LEN_{RNOSE}$$

$$SIN(ROT_{RNOSE})=(|(Y_{114}-Y_{115})|/LEN_{RNOSE}$$

Next, the upturned features/downturned features enhancement processing portion 377 compares an average angle for the left and right nostrils $(ROT_{NOSE}=(ROT_{LNOSE}+ROT_{RNOSE})/2)$ to an average value $MROT_{NOSE}$ for the average angle for the left and right nostrils (for a plurality of users), which is determined in advance (Step S709). In a case where $ROT_{NOSE}$ is greater than $MROT_{NOSE}$ at Step S709, the upturned features/downturned features enhancement processing portion 377 then performs the enhancement processing for the nostril angles (Step S711).

In a case where it has been determined at Step S703 that the face is the downturned features type, the upturned features/downturned features enhancement processing portion 377 then computes the average angle for the left and right eyes $(ROT_{EYE}=(ROT_{LEYE}+ROT_{REYE})/2)$, in the same manner as in the case of the upturned features type. Then $ROT_{EYE}$ is compared to $MROT_{EYE}$ (Step S713). In a case where $ROT_{EYE}$ is less than $MROT_{EYE}$ at Step S713, the upturned features/downturned features enhancement processing portion 377 then performs the enhancement processing for the eye angles (Step S715).

Next, the upturned features/downturned features enhancement processing portion 377 computes the average angle for the left and right nostrils $(ROT_{NOSE}=(ROT_{LNOSE}+ROT_{RNOSE})/2)$, in the same manner as in the case of the upturned features type. Then the upturned features/downturned features enhancement processing portion 377 compares $ROT_{NOSE}$ to $MROT_{NOSE}$ (Step S717). In a case where $ROT_{NOSE}$ is less than $MROT_{NOSE}$ at Step S717, the upturned features/downturned features enhancement processing portion 377 then performs the enhancement processing for the nostril angles (Step S719).

Here, the positions and the angles of the eyes that are included in the configuration information that is modified at Step S707 and Step S715 are derived by the computations below.

$$ROT_{EYE}=ROT_{EYE}+F^*(ROT_{EYE}-MROT_{EYE})$$

$$X209=(X209-X201)+COS(ROT_{EYE})^*(X209-X201)-SIN(ROT_{EYE})^*(Y209-Y201)$$

$$Y209=(Y209-Y201)+SIN(ROT_{EYE})^*(X209-X201)+COS(ROT_{EYE})^*(Y209-Y201)$$

$$X210=(X210-X201)+COS(ROT_{EYE})^*(X210-X201)-SIN(ROT_{EYE})^*(Y210-Y201)$$

$$Y210=(Y210-Y201)+SIN(ROT_{EYE})^*(X210-X201)+COS(ROT_{EYE})^*(Y210-Y201)$$

$$X211=(X211-X201)+COS(ROT_{EYE})^*(X211-X201)-SIN(ROT_{EYE})^*(Y211-Y201)$$

$$Y211=(Y211-Y201)+SIN(ROT_{EYE})^*(X211-X201)+COS(ROT_{EYE})^*(Y211-Y201)$$

$$X212=(X212-X201)+COS(ROT_{EYE})^*(X212-X201)-SIN(ROT_{EYE})^*(Y212-Y201)$$

$$Y212=(Y212-Y201)+SIN(ROT_{EYE})^*(X212-X201)+COS(ROT_{EYE})^*(Y212-Y201)$$

Further, the angles and the positions of the nostrils that are included in the configuration information that is modified at Step S711 and Step S719 are derived by the computations below.

$$ROT_{NOSE}=ROT_{NOSE}+F^*(ROT_{NOSE}-MROT_{NOSE})$$

$$X213=(X213-X215)+COS(ROT_{NOSE})^*(X213-X215)-SIN(ROT_{NOSE})^*(Y213-Y215)$$

$$Y213=(Y213-Y215)+SIN(ROT_{NOSE})^*(X213-X215)+COS(ROT_{NOSE})^*(Y213-Y215)$$

$$X214=(X214-X215)+COS(ROT_{NOSE})^*(X214-X215)-SIN(ROT_{NOSE})^*(Y214-Y215)$$

$$Y214=(Y214-Y215)+SIN(ROT_{NOSE})^*(X214-X215)+COS(ROT_{NOSE})^*(Y214-Y215)$$

Figure 23:
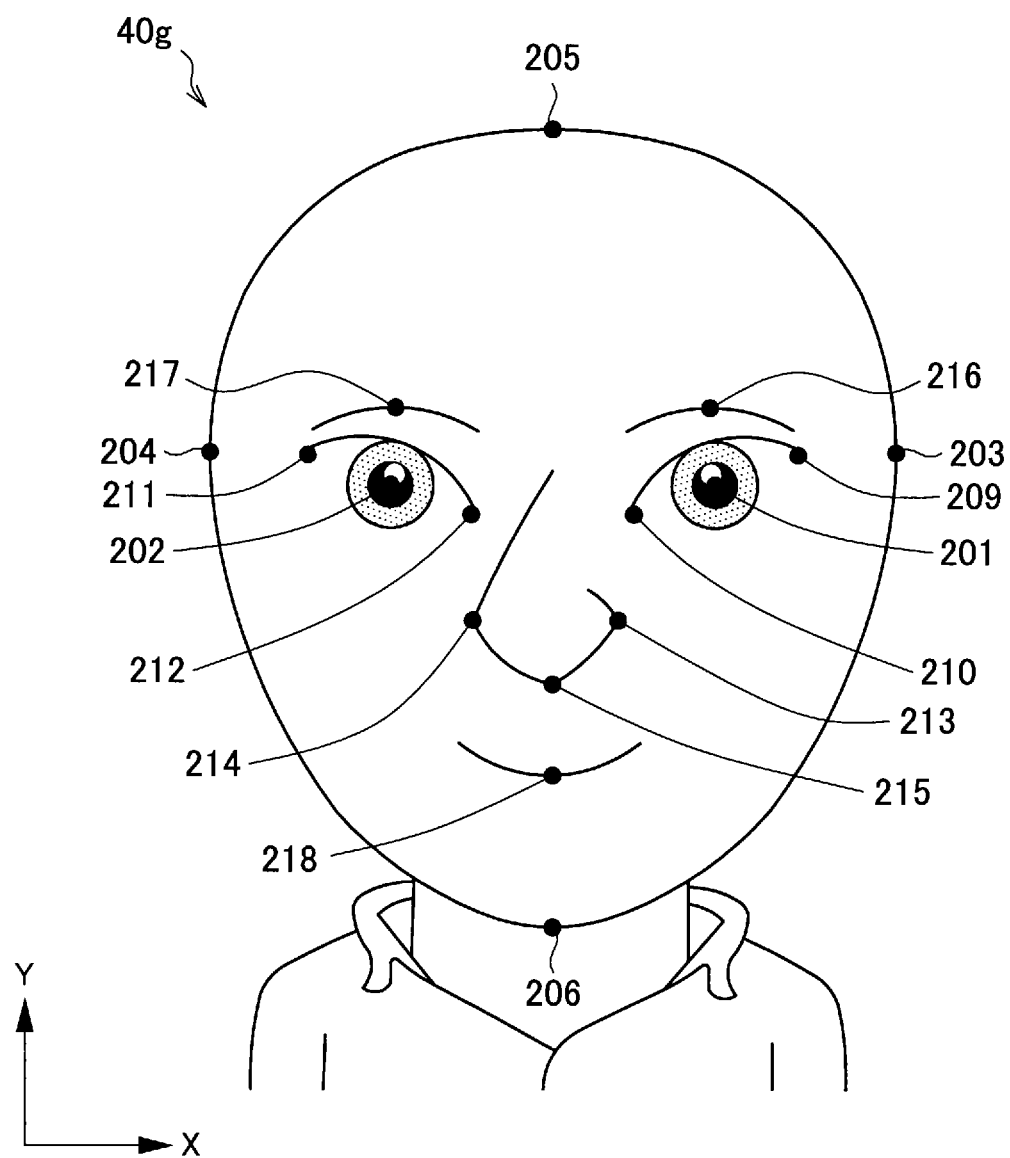
FIG. 23 is an explanatory figure that shows an example of results of the upturned features enhancement processing according to the present embodiment.
Figure 24:
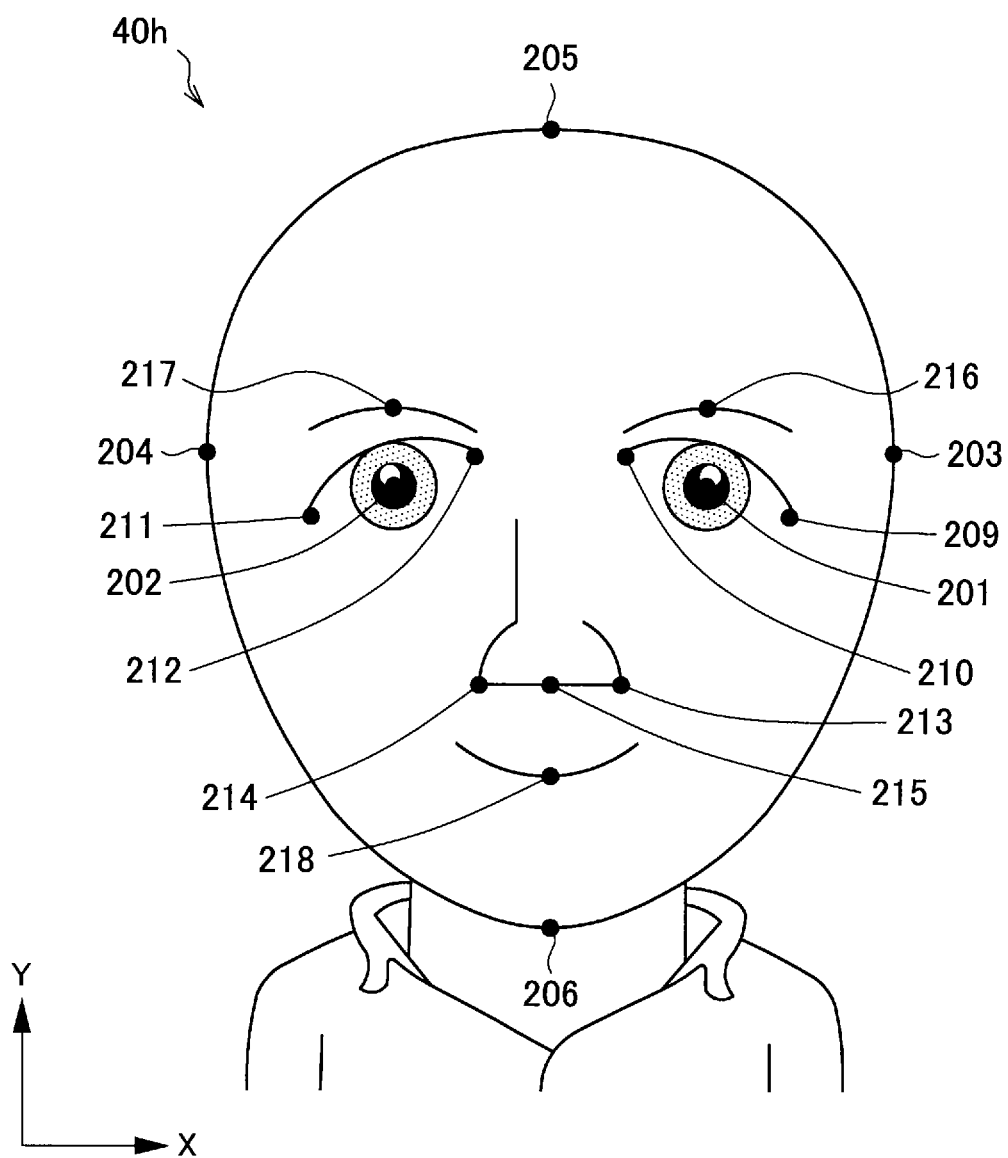
FIG. 24 is an explanatory figure that shows an example of results of the downturned features enhancement processing according to the present embodiment.

Note that an example of the configuration of the various facial features after the enhancement processing in a case where the face was determined to be the upturned features type is shown in FIG. 23. FIG. 23 is an explanatory figure that shows an example of the results of the upturned features enhancement processing according to the present embodiment. As shown in FIG. 23, the angles of the eye features and the nose feature are enhanced. In contrast, an example of the configuration of the facial features after the enhancement processing in a case where the face was determined to be the downturned features type is shown in FIG. 24. FIG. 24 is an explanatory figure that shows an example of the results of the downturned features enhancement processing according to the present embodiment. As shown in FIG. 24, the angles of the eye features and the nose feature are enhanced.

The positions and the angles of the various facial features that are necessary in order to create a facial sketch that resembles the subject are derived by the processing that has been described above.

Returning once again to FIG. 6, next, the facial sketch is created based on the configuration information and is output (Step S119). Based on the configuration information that has been generated by the configuration information generation portion 37, the facial sketch creation portion 39 can create a facial sketch that resembles the subject by positioning images of the facial features, even though it has no specialized knowledge, know-how, or sense. Here, the facial sketch creation portion 39 may automatically select the images of the facial features that will be used based on the positions of the characteristic points of the user's face, the results of the facial type classification, and the like. Facial feature images that the user has selected manually may also be used for the images of the facial features.

Once the facial sketch has been output, a determination is then made as to whether or not the facial photograph has been changed (Step S121), and in a case where it has been changed, the processing returns to Step S101. On the other hand, in a case where the facial photograph has not been changed, the facial sketch creation processing is terminated.

A preferred embodiment of the present disclosure has been explained in detail above with reference to the appended drawings, but the present disclosure is not limited to this example. It will be clear to a person who has ordinary knowledge of the technical field of the present disclosure that various types of modified examples and revised examples can be devised within the category of the technical concepts that are described in the scope of the claims, and it should be understood that these examples obviously fall within the scope of the claims of the present disclosure.

For example, the embodiment that is described above is configured as the facial sketch creation device that creates the facial sketch, but the present disclosure is not limited to this example. For example, the present disclosure may also be configured as two separate devices: a configuration information generation device that outputs the configuration information and a facial sketch creation device that receives the configuration information and creates the facial sketch. It is also obvious that the individual types of processing, such as the identification of the characteristic points, the classification of the facial types, and the like, may be performed by separate devices.

Furthermore, in the embodiment that is described above, the facial sketch creation device that is explained creates a caricature of a human face, but the facial sketch is not limited to this form. For example, a caricature of an anthropomorphized animal, robot, or the like is also included in the concept of the facial sketch.

Further, in the embodiment that is described above, the facial sketch creation device that is explained creates a two-dimensional facial sketch, but the present disclosure also obviously applies to a device that creates a three-dimensional caricature.

Note that in the present specification, the steps that are described in the flowcharts indicate processing that is performed in a temporal sequence in the order that is described, but it is obvious that that the processing does not necessarily have to be performed in a temporal sequence, and processing that is performed in parallel and individually is also included. Furthermore, even for the steps that are performed in a temporal sequence, it is obvious that the order in which the steps are performed can be modified as desired in certain cases.

The present disclosure contains subject matter related to that disclosed in Japanese Priority Patent Application JP 2011-038441 filed in the Japan Patent Office on Feb. 24, 2011, the entire content of which is hereby incorporated by reference.

What is claimed is:

1. A facial sketch creation device, comprising:
an image acquisition portion that acquires a facial image of a user;
a characteristic point acquisition portion that acquires position information for characteristic points that pertain to a plurality of facial features within the facial image;
a facial type classification portion that, using the position information for the characteristic points, classifies the facial image as a facial type based on relative positions of the plurality of facial features;
a configuration information generation portion that generates configuration information by taking an initial configuration that is based on the position information for the characteristic points and performing modification of the initial configuration by enhancing characteristics that indicate the classified facial type; and
a facial sketch creation portion that creates a facial sketch by positioning the plurality of facial features based on the configuration information,
wherein the facial type classification portion includes a first classification portion that classifies the facial image as one of a closely grouped features type, for which the relative positions of the plurality of facial features exhibit a characteristic of being shifted inward with respect to a facial outline, and a widely spaced features type, for which the relative positions of the facial features exhibit a characteristic of being shifted outward with respect to the facial outline, the classifying of the facial image being based on horizontal axis position information that has been acquired by the characteristic point acquisition portion and that indicates a left eye, a right eye, a left edge of the facial outline, and a right edge of the facial outline,
wherein the configuration information generation portion includes a first enhancement processing portion that modifies at least one of vertical axis position information and the horizontal axis position information for the plurality of facial features that are positioned within the facial outline, based on the result of the classification by the first classification portion, and
wherein the first enhancement processing portion performs modification processing such that the plurality of facial features are shifted closer to the center of the face if the facial image is classified as the closely grouped features type, and the first enhancement processing portion performs modification processing such that the plurality of facial features are shifted toward the outer side of the facial outline if the facial image is classified as the widely spaced features type.

2. The facial sketch creation device according to claim 1, wherein the configuration information generation portion performs the modification by linking the plurality of facial features, using at least one of the vertical axis position information and the horizontal axis position information for the plurality of facial features, and setting the position information for one of the plurality of facial features based on a variation in the position information for another of the plurality of facial features.

3. The facial sketch creation device according to claim 1, wherein the first enhancement processing portion modifies the vertical axis position information for a nose feature using an amount of modification that is based on an amount of modification of the vertical axis position information for a mouth feature.

4. The facial sketch creation device according to claim 1, wherein the facial sketch creation portion creates the facial sketch using the plurality of facial features in which the characteristics that indicate the classified facial type have been enhanced.

5. A facial sketch creation device, comprising:
an image acquisition portion that acquires a facial image of a user;
a characteristic point acquisition portion that acquires position information for characteristic points that pertain to a plurality of facial features within the facial image;
a facial type classification portion that, using the position information for the characteristic points, classifies the facial image as a facial type based on relative positions of the plurality of facial features;
a configuration information generation portion that generates configuration information by taking an initial configuration that is based on the position information for the characteristic points and performing modification of the initial configuration by enhancing characteristics that indicate the classified facial type; and
a facial sketch creation portion that creates a facial sketch by positioning the plurality of facial features based on the configuration information,
wherein the facial type classification portion includes a second classification portion that classifies the facial image as one of a high-positioned features type, for which the relative positions of the plurality of facial features exhibit a characteristic of being shifted toward an upper side of a facial outline, and a low-positioned features type, for which the relative positions of the plurality of facial features exhibit a characteristic of being shifted toward a lower side of the facial outline, the classifying of the facial image being based on vertical axis position information that has been acquired by the characteristic point acquisition portion and that indicates a top edge of a forehead, a bottom edge of a chin, a top edge of a left eyehole, and a top edge of a right eyehole,
wherein the configuration information generation portion includes a second enhancement processing portion that modifies the vertical axis position information for the plurality of facial features that are positioned within the facial outline, based on the result of the classification by the second classification portion, and
wherein the second enhancement processing portion performs modification processing such that the plurality of facial features are shifted toward the upper side of the facial outline if the facial image is classified as the high-positioned features type, and the second enhancement processing portion performs modification processing such that the plurality of facial features are shifted toward the lower side of the facial outline if the facial image is classified as the low-positioned features type.

6. The facial sketch creation device according to claim 5, wherein the facial type classification portion further includes a first classification portion that classifies the facial image as one of a closely grouped features type, for which the relative positions of the plurality of facial features exhibit a characteristic of being shifted inward with respect to a facial outline, and a widely spaced features type, for which the relative positions of the facial features exhibit a characteristic of being shifted outward with respect to the facial outline, the classifying of the facial image being based on the horizontal axis position information that has been acquired by the characteristic point acquisition portion and that indicates a left eye, a right eye, a left edge of the facial outline, and a right edge of the facial outline, and
wherein the configuration information generation portion further includes a first enhancement processing portion that modifies at least one of the vertical as position information and horizontal axis position information for the plurality of facial features that are positioned within the facial outline, based on the result of the classification by the first classification portion.

7. The facial sketch creation device according to claim 5, wherein the second enhancement processing portion performs the modification such that changes in the vertical axis position information for the plurality of facial features that are positioned within the facial outline are in conjunction with one another.

8. A facial sketch creation device, comprising:
an image acquisition portion that acquires a facial image of a user;
a characteristic point acquisition portion that acquires position information for characteristic points that pertain to a plurality of facial features within the facial image;
a facial type classification portion that, using the position information for the characteristic points, classifies the facial image as a facial type based on relative positions of the plurality of facial features;
a configuration information generation portion that generates configuration information by taking an initial configuration that is based on the position information for the characteristic points and performing modification of the initial configuration by enhancing characteristics that indicate the classified facial type; and
a facial sketch creation portion that creates a facial sketch by positioning the plurality of facial features based on the configuration information,
wherein the facial type classification portion includes a third classification portion that classifies the facial image as one of an upturned features type, for which the angles of the plurality of facial features exhibit a characteristic of being turned upward, and a downturned features type, for which the angles of the plurality of facial features exhibit a characteristic of being turned downward, the classifying of the facial image being based on vertical axis position information that has been acquired by the characteristic point acquisition portion and that indicates an inner edge of a left eye, an outer edge of the left eye, an inner edge of a right eye, an outer edge of the right eye, an outer edge of a left nostril, an outer edge of a right nostril, and a center of the tip of a nose,
wherein the configuration information generation portion includes a third enhancement processing portion that modifies angles of at least some of the plurality of facial features, based on the result of the classification by the third classification portion, and wherein the third enhancement processing portion performs modification processing such that the angles of the at least some of the plurality of facial features are turned upward if the facial image is classified as the upturned features type, and the third enhancement processing portion performs modification processing such that the angles of the at least some of the plurality of facial features are turned downward if the facial image is classified as the downturned features type.

9. The facial sketch creation device according to claim 8, wherein the third enhancement processing portion modifies at least one of angles of eye features and angles of the nostrils for a nose feature.

10. A configuration information generation device, comprising:

a characteristic point acquisition portion that acquires position information for characteristic points that pertain to a plurality of facial features within a facial image of a user;

a classification result acquisition portion that acquires a classification result in which the facial image has been classified as a facial type, using the position information for the characteristic points and based on relative positions of the plurality of the facial features; and a configuration information generation portion that generates configuration information by taking an initial configuration that is based on the position information for the characteristic points and performing modification of the initial configuration by enhancing characteristics that indicate the classified facial type, wherein the facial type classification portion includes a first classification portion that classifies the facial image as one of a closely grouped features type, for which the relative positions of the plurality of facial features exhibit a characteristic of being shifted inward with respect to a facial outline, and a widely spaced features type, for which the relative positions of the plurality of facial features exhibit a characteristic of being shifted outward with respect to the facial outline, the classifying of the facial image being based on horizontal axis position information that has been acquired by the characteristic point acquisition portion and that indicates a left eye, a right eye, a left edge of the facial outline, and a right edge of the facial outline, wherein the configuration information generation portion includes a first enhancement processing portion that modifies at least one of vertical axis position information and the horizontal axis position information for the plurality of facial features that are positioned within the facial outline, based on the result of the classification by the first classification portion, and wherein the first enhancement processing portion performs modification processing such that the plurality of facial features are shifted closer to the center of the face if the facial image is classified as the closely grouped features type, and the first enhancement processing portion performs modification processing such that the plurality of facial features are shifted toward the outer side of the facial outline if the facial image is classified as the widely spaced features type.

11. A computer-implemented configuration information generation method, comprising the steps of:

displaying a facial image of a subject on a display device;

acquiring position information for characteristic points that pertain to a plurality of facial features within the facial image;

acquiring a classification result in which the facial image has been classified as a facial type, using the position information for the characteristic points and based on relative positions of the plurality of the facial features; and generating configuration information by taking an initial configuration that is based on the position information for the characteristic points and performing modification of the initial configuration by enhancing characteristics that indicate the classified facial type, wherein the facial type classification portion includes a first classification portion that classifies the facial image as one of a closely grouped features type, for which the relative positions of the plurality of facial features exhibit a characteristic of being shifted inward with respect to a facial outline, and a widely spaced features type, for which the relative positions of the plurality of facial features exhibit a characteristic of being shifted outward with respect to the facial outline, the classifying of the facial image being based on horizontal axis position information that has been acquired by the characteristic point acquisition portion and that indicates a left eye, a right eye, a left edge of the facial outline, and a right edge of the facial outline, wherein the configuration information generation portion includes a first enhancement processing portion that modifies at least one of vertical axis position information and the horizontal axis position information for the plurality of facial features that are positioned within the facial outline, based on the result of the classification by the first classification portion, and wherein the first enhancement processing portion performs modification processing such that the plurality of facial features are shifted closer to the center of the face if the facial image is classified as the closely grouped features type, and the first enhancement processing portion performs modification processing such that the plurality of facial features are shifted toward the outer side of the facial outline if the facial image is classified as the widely spaced features type.

12. A non-transitory computer-readable storage medium in which is stored a program for causing a computer to function as a configuration information generation device that includes:

a characteristic point acquisition portion that acquires position information for characteristic points that pertain to a plurality of facial features within a facial image of a user, a classification result acquisition portion that acquires a classification result in which the facial image has been classified as a facial type, using the position information for the characteristic points and based on relative positions of the plurality of the facial features, and a configuration information generation portion that generates configuration information by taking an initial configuration that is based on the position information for the characteristic points and performing modification of the initial configuration by enhancing characteristics that indicate the classified facial type, wherein the facial type classification portion includes a first classification portion that classifies the facial image as one of a closely grouped features type, for which the relative positions of the plurality of facial features exhibit a characteristic of being shifted inward with respect to a facial outline, and a widely spaced features type, for which the relative positions of the plurality of facial features exhibit a characteristic of being shifted outward with respect to the facial outline, the classifying of the facial image being based on horizontal axis position information that has been acquired by the characteristic point acquisition portion and that indicates a left eye, a right eye, a left edge of the facial outline, and a right edge of the facial outline, wherein the configuration information generation portion includes a first enhancement processing portion that modifies at least one of vertical axis position information and the horizontal axis position information for the plurality of facial features that are positioned within the facial outline, based on the result of the classification by the first classification portion, and wherein the first enhancement processing portion performs modification processing such that the plurality of facial features are shifted closer to the center of the face if the facial image is classified as the closely grouped features type, and the first enhancement processing portion performs modification processing such that the plurality of facial features are shifted toward the outer side of the facial outline if the facial image is classified as the widely spaced features type.

13. A configuration information generation device, comprising:
a characteristic point acquisition portion that acquires position information for characteristic points that pertain to a plurality of facial features within a facial image of a user;
a classification result acquisition portion that acquires a classification result in which the facial image has been classified as a facial type, using the position information for the characteristic points and based on relative positions of the plurality of the facial features; and
a configuration information generation portion that generates configuration information by taking an initial configuration that is based on the position information for the characteristic points and performing modification of the initial configuration by enhancing characteristics that indicate the classified facial type,
wherein the classification result acquisition portion includes a classification portion that classifies the facial image as one of a high-positioned features type, for which the relative positions of the plurality of facial features exhibit a characteristic of being shifted toward an upper side of a facial outline, and a low-positioned features type, for which the positions of the plurality of facial features exhibit a characteristic of being shifted toward a lower side of the facial outline, the classifying of the facial image being based on vertical axis position information that has been acquired by the characteristic point acquisition portion and that indicates a top edge of a forehead, a bottom edge of a chin, a top edge of a left eyehole, and a top edge of a right eyehole,
wherein the configuration information generation portion includes an enhancement processing portion that modifies the vertical axis position information for the plurality of facial features that are positioned within the facial outline, based on the result of the classification by the classification portion, and
wherein the enhancement processing portion performs modification processing such that the plurality of facial features are shifted toward an upper side of the face if the facial image is classified as the high-positioned features type, and the enhancement processing portion performs modification processing such that the plurality of facial features are shifted toward a lower side of the face if the facial image is classified as the low-positioned features type.

14. A configuration information generation device, comprising:
a characteristic point acquisition portion that acquires position information for characteristic points that pertain to a plurality of facial features within a facial image of a user;
a classification result acquisition portion that acquires a classification result in which the facial image has been classified as a facial type, using the position information for the characteristic points and based on relative positions of the plurality of the facial features; and
a configuration information generation portion that generates configuration information by taking an initial configuration that is based on the position information for the characteristic points and performing modification of the initial configuration by enhancing characteristics that indicate the classified facial type,
wherein the classification result acquisition portion includes a classification portion that classifies the facial image as one of an upturned features type, for which the angles of the plurality of facial features exhibit a characteristic of being turned upward, and a downturned features type, for which the angles of the plurality of facial features exhibit a characteristic of being turned downward, the classifying of the facial image being based on vertical axis position information that has been acquired by the characteristic point acquisition portion and that indicates an inner edge of a left eye, an outer edge of the left eye, an inner edge of a right eye, an outer edge of the right eye, an outer edge of a left nostril, an outer edge of a right nostril, and a center of the tip of a nose,
wherein the configuration information generation portion includes an enhancement processing portion that modifies angles of at least some of the plurality of facial features, based on the result of the classification by the classification portion, and
wherein the enhancement processing portion performs modification processing such that the angles of the at least some of the plurality of facial features are turned upward if the facial image is classified as the upturned features type, and the enhancement processing portion performs modification processing such that the angles of the at least some of the plurality of facial features are turned downward if the facial image is classified as the downturned features type.

15. A computer-implemented configuration information generation method, comprising the steps of:
displaying a facial image of a subject on a display device;
acquiring position information for characteristic points that pertain to a plurality of facial features within the facial image;
acquiring a classification result in which the facial image has been classified as a facial type, using the position information for the characteristic points and based on relative positions of the plurality of the facial features; and
generating configuration information by taking an initial configuration that is based on the position information for the characteristic points and performing modification of the initial configuration by enhancing characteristics that indicate the classified facial type, wherein the step of acquiring a classification result includes a step of classifying the facial image as one of a high-positioned features type, for which the relative positions of the plurality of facial features exhibit a characteristic of being shifted toward an upper side of a facial outline, and a low-positioned features type, for which the relative positions of the plurality of facial features exhibit a characteristic of being shifted toward a lower side of the facial outline, the classifying of the facial image being based on vertical axis position information that has been acquired by a characteristic point acquisition portion and that indicates a top edge of a forehead, a bottom edge of a chin, a top edge of a left eyehole, and a top edge of a right eyehole, wherein the step of generating configuration information includes a step of modifying the vertical axis position information for the plurality of facial features that are positioned within the facial outline, based on the result of the classification result, and wherein the step of modifying performs modification processing such that the relative positions of the plurality of facial features are shifted toward an upper side of the facial outline if the facial image is classified as the high-positioned features type, and the second enhancement processing portion performs modification processing such that the relative positions of the plurality of facial features are shifted toward a lower side of the facial outline if the facial image is classified as the low-positioned features type.

16. A computer-implemented configuration information generation method, comprising the steps of:
displaying a facial image of a user on a display device;
acquiring position information for characteristic points that pertain to a plurality of facial features within the facial image;
acquiring a classification result in which the facial image has been classified as a facial type, using the position information for the characteristic points and based on relative positions of the plurality of the facial features; and
generating configuration information by taking an initial configuration that is based on the position information for the characteristic points and performing modification of the initial configuration by enhancing characteristics that indicate the classified facial type;
wherein the step of acquiring a classification result includes a step of classifying the facial image as one of an upturned features type, for which the angles of the plurality of facial features exhibit a characteristic of being turned upward, and a downturned features type, for which the angles of the plurality of facial features exhibit a characteristic of being turned downward, the classifying of the facial image being based on vertical axis position information that has been acquired by the characteristic point acquisition portion and that indicates an inner edge of a left eye, an outer edge of the left eye, an inner edge of a right eye, an outer edge of the right eye, an outer edge of a left nostril, an outer edge of a right nostril, and a center of the tip of a nose,
wherein the step of generating configuration information includes a step of modifying angles of at least some of the plurality of facial features, based on the result of the classification result, and
wherein the step of modifying performs modification processing such that the angles of at least some of the plurality of the facial features are turned upward if the facial image is classified as the upturned features type,
and the step of modifying performs modification processing such that the angles of the at least some of the plurality of facial features are turned downward if the facial image is classified as the downturned features type.

17. A non-transitory computer-readable storage medium in which is stored a program for causing a computer to function as a configuration information generation device that includes
a characteristic point acquisition portion that acquires position information for characteristic points that pertain to a plurality of facial features within a facial image of a user,
a classification result acquisition portion that acquires a classification result in which the facial image has been classified as a facial type, using the position information for the characteristic points and based on relative positions of the plurality of the facial features, and
a configuration information generation portion that generates configuration information by taking an initial configuration that is based on the position information for the characteristic points and performing modification of the initial configuration by enhancing characteristics that indicate the classified facial type,
wherein the classification result acquisition portion includes a classification portion that classifies the facial image as one of a high-positioned features type, for which the relative positions of the plurality of facial features exhibit a characteristic of being shifted toward an upper side of a facial outline, and a low-positioned features type, for which the relative positions of the plurality of facial features exhibit a characteristic of being shifted toward a lower side of the facial outline, the classifying of the facial image being based on vertical axis position information that has been acquired by the characteristic point acquisition portion and that indicates a top edge of a forehead, a bottom edge of a chin, a top edge of a left eyehole, and a top edge of a right eyehole,
wherein the configuration information generation portion includes an enhancement processing portion that modifies the vertical axis position information for the plurality of facial features that are positioned within the facial outline, based on the result of the classification by the classification portion, and
wherein the enhancement processing portion performs modification processing such that the relative positions of the plurality of facial features are shifted toward an upper side of the facial outline if the facial image is classified as the high-positioned features type, and the enhancement processing portion performs modification processing such that the relative positions of the plurality of facial features are shifted toward a lower side of the facial outline if the facial image is classified as the low-positioned features type.

18. A non-transitory computer-readable storage medium in which is stored a program for causing a computer to function as a configuration information generation device that includes
a characteristic point acquisition portion that acquires position information for characteristic points that pertain to a plurality of facial features within a facial image of a user,
a classification result acquisition portion that acquires a classification result in which the facial image has been classified as a facial type, using the position information for the characteristic points and based on relative positions of the plurality of the facial features, and a configuration information generation portion that generates configuration information by taking an initial configuration that is based on the position information for the characteristic points and performing modification of the initial configuration by enhancing characteristics that indicate the classified facial type, wherein the classification result acquisition portion includes a classification portion that classifies the facial image as one of an upturned features type, for which angles of the at least some of the plurality of facial features exhibit a characteristic of being turned upward, and a downturned features type, for which the angles of the at least some of the plurality of facial features exhibit a characteristic of being turned downward, the classifying of the facial image being based on vertical axis position information that has been acquired by the characteristic point acquisition portion and that indicates an inner edge of a left eye, an outer edge of the left eye, an inner edge of a right eye, an outer edge of the right eye, an outer edge of a left nostril, an outer edge of a right nostril, and a center of the tip of a nose, wherein the configuration information generation portion includes an enhancement processing portion that modifies the angles of specific ones of the facial features, based on the result of the classification by the third classification portion, and wherein the enhancement processing portion performs modification processing such that the angles of the at least some of the plurality of facial features are turned upward if the facial image is classified as the upturned features type, and the enhancement processing portion performs modification processing such that the angles of the at least some of the plurality of facial features are turned downward if the facial image is classified as the downturned features type.

* * * * *